(12) United States Patent
Lee

(10) Patent No.: US 12,093,532 B2
(45) Date of Patent: Sep. 17, 2024

(54) DATA READING METHOD, MEMORY STORAGE DEVICE, AND MEMORY CONTROL CIRCUIT UNIT

(71) Applicant: PHISON ELECTRONICS CORP., Miaoli (TW)

(72) Inventor: Chih-Hsiang Lee, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 21 days.

(21) Appl. No.: 17/994,013

(22) Filed: Nov. 25, 2022

(65) Prior Publication Data

US 2024/0143182 A1 May 2, 2024

(30) Foreign Application Priority Data

Oct. 31, 2022 (TW) .................................. 111141454

(51) Int. Cl.
*G06F 3/06* (2006.01)
*G06F 12/02* (2006.01)

(52) U.S. Cl.
CPC .......... *G06F 3/0613* (2013.01); *G06F 3/0659* (2013.01); *G06F 3/0679* (2013.01); *G06F 12/0246* (2013.01)

(58) Field of Classification Search
None
See application file for complete search history.

(56) References Cited

U.S. PATENT DOCUMENTS

| 5,956,743 A * | 9/1999 | Bruce | G06F 11/1068 |
| | | | 714/E11.038 |
| 9,792,995 B1 * | 10/2017 | Shah | G11C 7/1039 |
| 10,445,019 B2 * | 10/2019 | Yun | G06F 3/0673 |
| 2013/0262745 A1 * | 10/2013 | Lin | G06F 3/0679 |
| | | | 711/E12.008 |
| 2014/0156911 A1 * | 6/2014 | Alcantara | G06F 3/061 |
| | | | 711/103 |
| 2015/0378819 A1 | 12/2015 | Frost et al. | |
| 2020/0004455 A1 * | 1/2020 | Williams | G06F 12/0246 |
| 2022/0229595 A1 * | 7/2022 | Lee | G06F 3/0679 |

FOREIGN PATENT DOCUMENTS

TW 202125263 7/2021

* cited by examiner

*Primary Examiner* — Kaushikkumar M Patel
(74) *Attorney, Agent, or Firm* — JCIPRNET

(57) ABSTRACT

A memory control method, a memory storage device, and a memory control circuit unit are provided. The method includes: receiving multiple read commands at least instructing to read first data stored in a first plane and second data stored in a second plane from a host system; sending multiple read command sequences at least instructing to execute a first read operation on the first plane to obtain the first data and to execute a second read operation on the second plane to obtain the second data according to the read commands; determining a data transmission order according to performance of the first read operation and the second read operation; and sequentially receiving the first data and the second data from a rewritable non-volatile memory module according to the data transmission order.

30 Claims, 14 Drawing Sheets

DATA READING METHOD, MEMORY STORAGE DEVICE, AND MEMORY CONTROL CIRCUIT UNIT

CROSS-REFERENCE TO RELATED APPLICATION

This application claims the priority benefit of Taiwan application Ser. No. 111141454, filed on Oct. 31, 2022. The entirety of the above-mentioned patent application is hereby incorporated by reference herein and made a part of this specification.

BACKGROUND

Technical Field

The disclosure relates to a memory management technology, and in particular to a data reading method, a memory storage device, and a memory control circuit unit.

Description of Related Art

Electronic devices such as mobile phones and notebook computers have grown rapidly in the past few years, which has led to a rapid increase in consumer demand for storage media. As the rewritable non-volatile memory module (for example, a flash memory) has characteristics such as non-volatile data, power saving, small volume, and no mechanical structure, the rewritable non-volatile memory module is very suitable for being built into various portable electronic devices exemplified above.

A rewritable non-volatile memory module may include one or more dies. The die is obtained from a wafer through laser cutting. Each die may be divided into one or more chip enable (CE) regions. Each chip enable region may include one or more planes (also referred to as memory planes). Each plane may include multiple physical blocks. Each physical block may include multiple physical pages. Each physical page may include multiple memory cells. The memory cell is the smallest physical element for storing data in the rewritable non-volatile memory module.

Generally speaking, when sequentially receiving read commands for different planes in the same chip enable region from a host system, the read commands are sequentially executed according to a receiving order to read data from the corresponding plane. Then, the read data may be sequentially returned to the host system according to a reading order. However, in practice, such standardized reading mechanism easily leads to waste of system performance.

SUMMARY

The disclosure provides a data reading method, a memory storage device, and a memory control circuit unit, which can improve the data reading performance of different planes in the same chip enable region.

An exemplary embodiment of the disclosure provides a data reading method for a rewritable non-volatile memory module. The rewritable non-volatile memory module includes multiple chip enable regions. A first chip enable region among the chip enable regions includes multiple planes. The planes include a first plane and a second plane. The data reading method includes the following steps. Multiple read commands are received from a host system. The read commands are at least used to instruct to read first data stored in the first plane and second data stored in the second plane. Multiple read command sequences are sent to the rewritable non-volatile memory module according to the read commands. The read command sequences are at least used to instruct to execute a first read operation on the first plane to obtain the first data and to execute a second read operation on the second plane to obtain the second data. A data transmission order is determined according to performance of the first read operation and the second read operation. The first data and the second data are sequentially received from the rewritable non-volatile memory module according to the data transmission order.

An exemplary embodiment of the disclosure further provides a memory storage device, which includes a connection interface unit, a rewritable non-volatile memory module, and a memory control circuit unit. The connection interface unit is used to couple to a host system. The rewritable non-volatile memory module includes multiple chip enable regions. A first chip enable region among the chip enable regions includes multiple planes. The planes include a first plane and a second plane. The memory control circuit unit is coupled to the connection interface unit and the rewritable non-volatile memory module. The memory control circuit unit is used to perform the following. Multiple read commands are received from the host system. The read commands are at least used to instruct to read first data stored in the first plane and second data stored in the second plane. Multiple read command sequences are sent to the rewritable non-volatile memory module according to the read commands. The read command sequences are at least used to instruct to execute a first read operation on the first plane to obtain the first data and to execute a second read operation on the second plane to obtain the second data. A data transmission order is determined according to performance of the first read operation and the second read operation. The first data and the second data are sequentially received from the rewritable non-volatile memory module according to the data transmission order.

An exemplary embodiment of the disclosure further provides a memory control circuit unit, which is used to control a rewritable non-volatile memory module. The rewritable non-volatile memory module includes multiple chip enable regions. A first chip enable region among the chip enable regions includes multiple planes. The planes include a first plane and a second plane. The memory control circuit unit includes a host interface, a memory interface, and a memory management circuit. The host interface is used to couple to a host system. The memory interface is used to couple to the rewritable non-volatile memory module. The memory management circuit is coupled to the host interface and the memory interface. The memory management circuit is used to perform the following. Multiple read commands are received from the host system. The read commands are at least used to instruct to read first data stored in the first plane and second data stored in the second plane. Multiple read command sequences are sent to the rewritable non-volatile memory module according to the read commands. The read command sequences are at least used to instruct to execute a first read operation on the first plane to obtain the first data and to execute a second read operation on the second plane to obtain the second data. A data transmission order is determined according to performance of the first read operation and the second read operation. The first data and the second data are sequentially received from the rewritable non-volatile memory module according to the data transmission order.

Based on the above, after receiving the read commands from the host system, the read command sequences may be sent correspondingly. The read command sequences may at least instruct to respectively execute the data read operations on different planes in the same chip enable region. According to the performance of the executed data read operations, the data transmission order may be determined. Then, according to the data transmission order, the data respectively read from the planes may be sequentially sent from the rewritable non-volatile memory module through a customized order. In this way, the data reading performance of different planes in the same chip enable region can be improved.

DETAILED DESCRIPTION OF DISCLOSED EMBODIMENTS

Generally speaking, a memory storage device (also referred to as a memory storage system) includes a rewritable non-volatile memory module and a controller (also referred to as a control circuit). The memory storage device may be used together with a host system, so that the host system may write data to the memory storage device or read data from the memory storage device.

Figure 1:
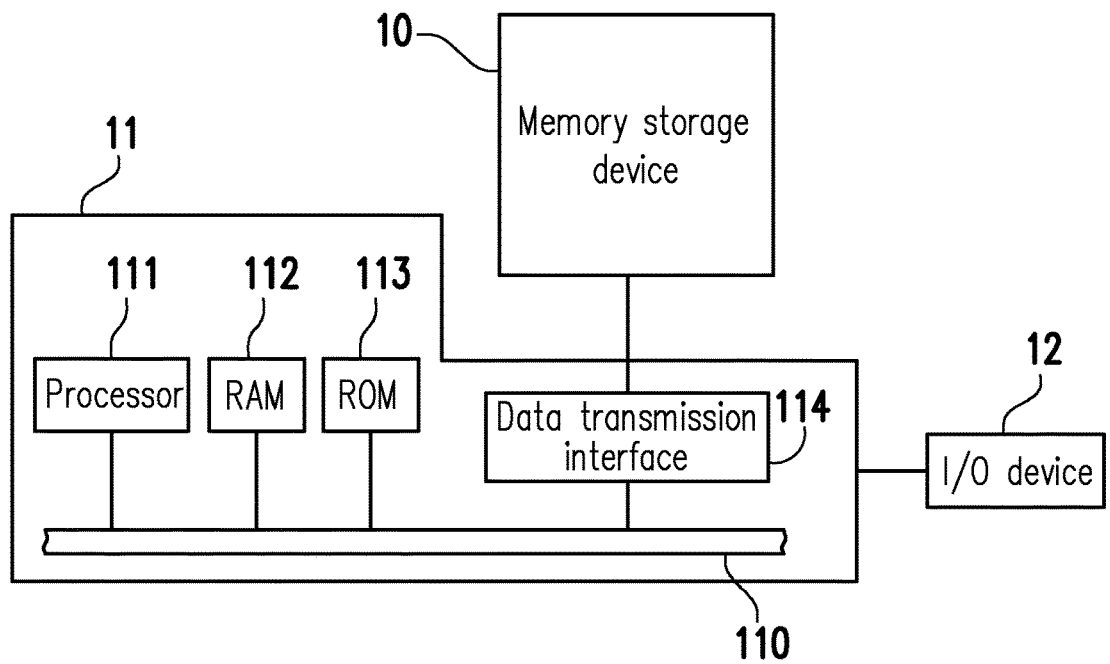
FIG. 1 is a schematic diagram of a host system, a memory storage device, and an input/output (I/O) device according to an exemplary embodiment of the disclosure.
Figure 2:
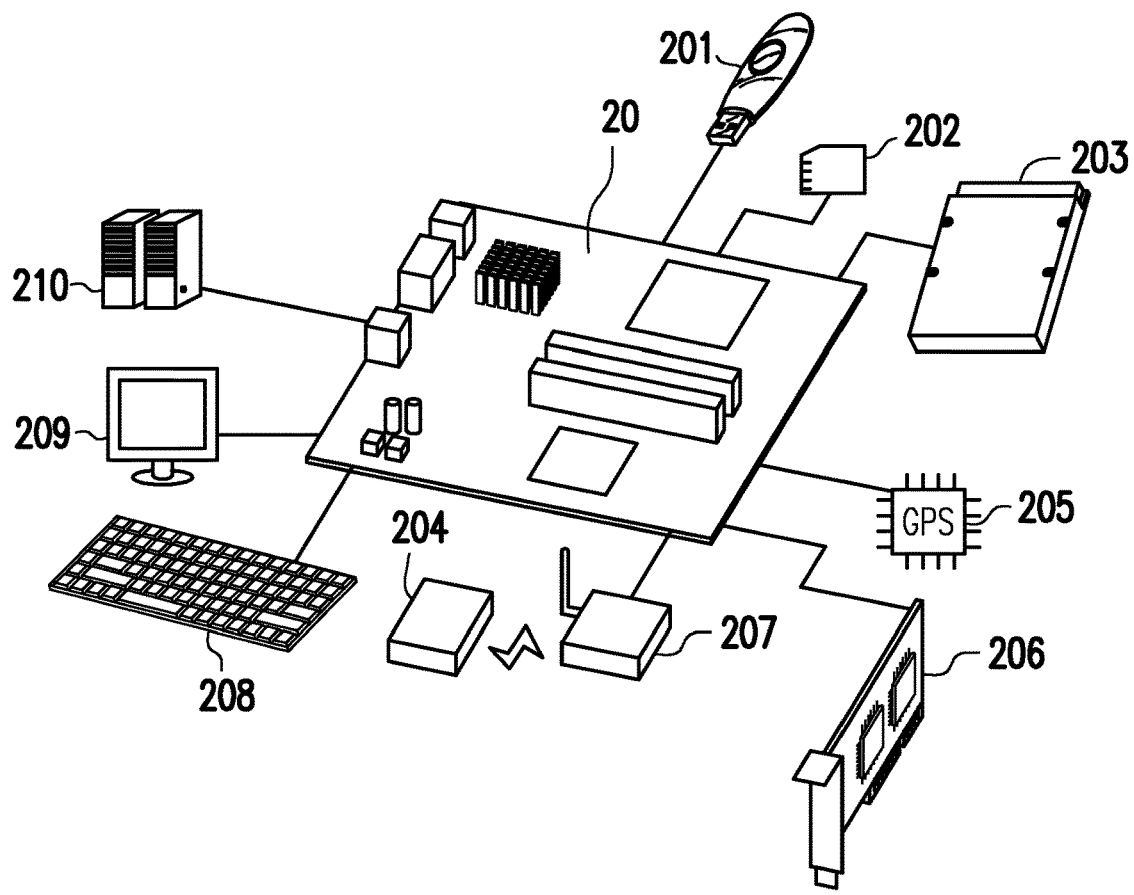
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to the memory storage device 10 through the data transmission interface 114. For example, the host system 11 may store data in the memory storage device 10 or read data from the memory storage device 10 via the data transmission interface 114. In addition, the host system 11 may be coupled to the I/O device 12 through the system bus 110. For example, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a near field communication (NFC) memory storage device, a Wi-Fi memory storage device, a Bluetooth memory storage device, a low-power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include a memory storage device 30 and a host system 31 of FIG. 3.

Figure 3:
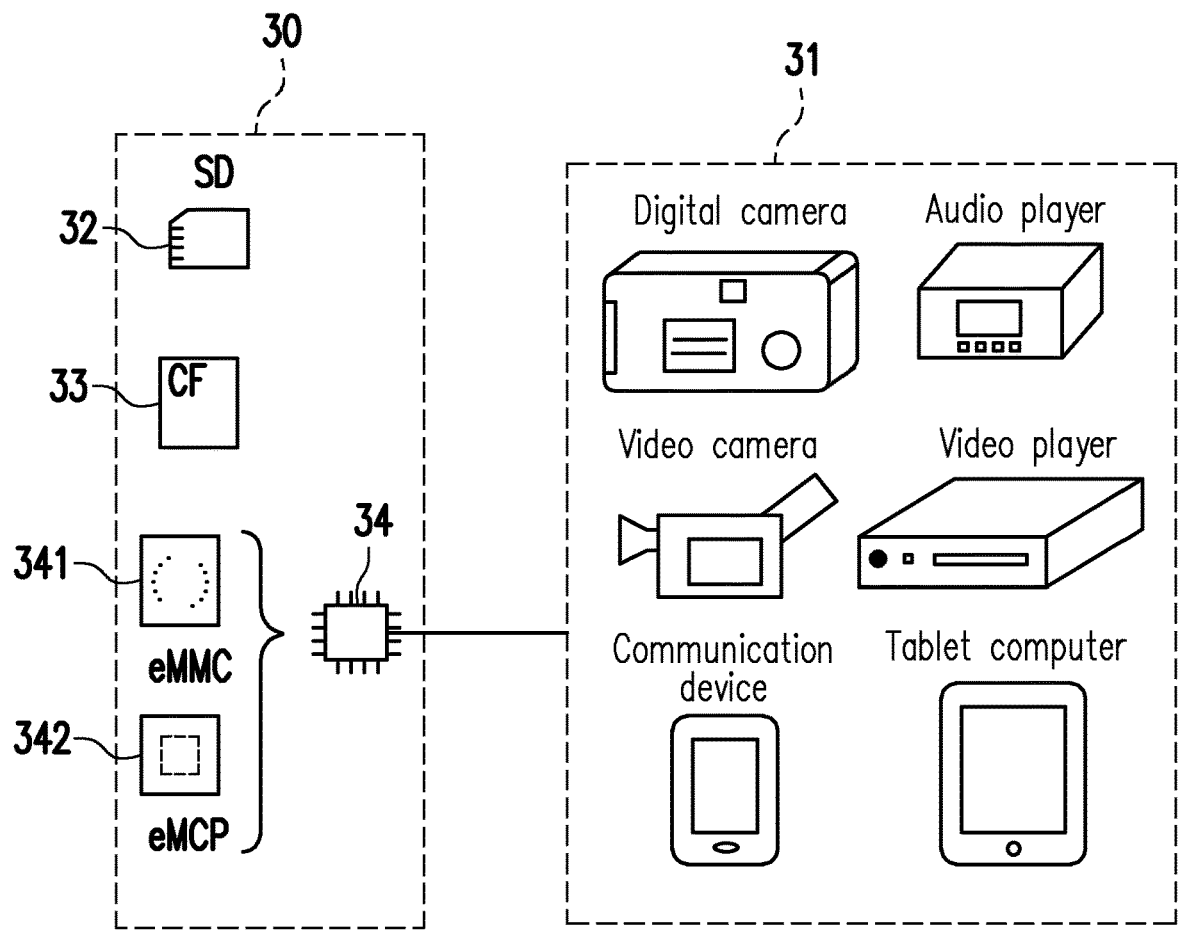
FIG. 3 is a schematic diagram of a host system and a memory storage device according to an exemplary embodiment of the disclosure.

FIG. 3 is a schematic diagram of a host system and a memory storage device according to an exemplary embodiment of the disclosure.

Please refer to FIG. 3. The memory storage device 30 may be used in conjunction with the host system 31 to store data. For example, the host system 31 may be a digital camera, a video camera, a communication device, an audio player, a video player, a tablet computer, or other systems. For example, the memory storage device 30 may be a secure digital (SD) card 32, a compact flash (CF) card 33, an embedded storage device 34, or various other non-volatile memory storage devices used by the host system 31. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4:
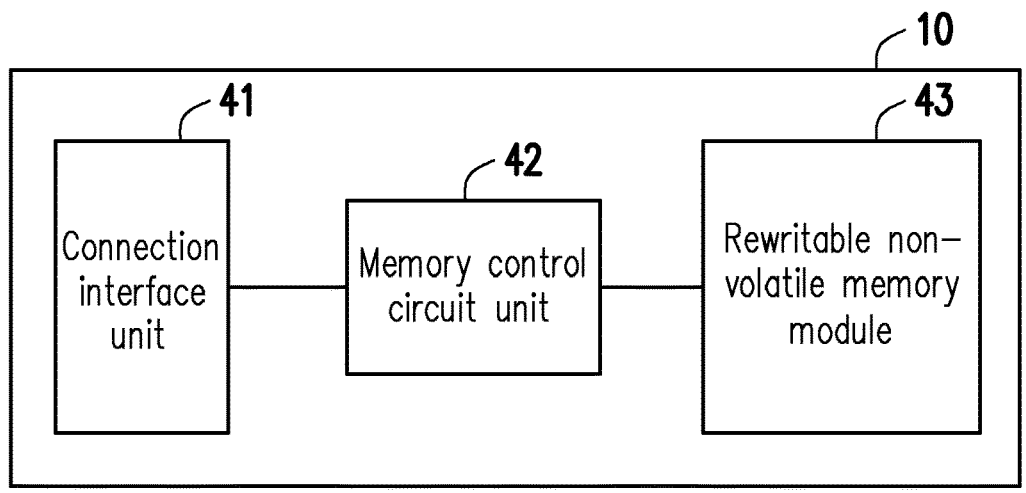
FIG. 4 is a schematic diagram of a memory storage device according to an exemplary embodiment of the disclosure.

FIG. 4 is a schematic diagram of a memory storage device according to an exemplary embodiment of the disclosure.

Please refer to FIG. 4. The memory storage device 10 includes a connection interface unit 41, a memory control circuit unit 42, and a rewritable non-volatile memory module 43.

The connection interface unit 41 is used to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in one chip, or the connection interface unit 41 may be arranged outside a chip including the memory control circuit unit 42.

The memory control circuit unit 42 is coupled to the connection interface unit 41 and the rewritable non-volatile memory module 43. The memory control circuit unit 42 is used to execute multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is used to store data written by the host system 11. The rewritable non-volatile memory module 43 may include a single level cell (SLC) NAND flash memory module (that is, a flash memory module that may store 1 bit in a memory cell), a multi level cell (MLC) NAND flash memory module (that is, a flash memory module that may store 2 bits in a memory cell), a triple level cell (TLC) NAND flash memory module (that is, flash memory module that may store 3 bits in a memory cell), a quad level cell (QLC) NAND flash memory module (that is, a flash memory module that may store 4 bits in a memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data to the memory cell" or "programming the memory cell". As the threshold voltage changes, each memory cell in the rewritable non-volatile memory module 43 has multiple storage states. Through applying a read voltage, it is possible to judge which storage state a memory cell belongs to, so as to obtain one or more bits stored in the memory cell.

In an exemplary embodiment, the memory cells of the rewritable non-volatile memory module 43 may constitute multiple physical programming units, and the physical programming units may constitute multiple physical erasing units. Specifically, the memory cells on the same word line may form one or more physical programming units. If one memory cell may store more than 2 bits, the physical programming units on the same word line may be at least classified into a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area includes multiple physical sectors for storing user data, and the redundancy bit area is used to store system data (for example, management data such as an error correcting code). In an exemplary embodiment, the data bit area includes 32 physical sectors, and the size of one physical sector is 512 bytes (B). However, in other exemplary embodiments, the data bit area may also include 8, 16, more, or less physical sectors, and the size of each physical sector may also be greater or smaller. On the other hand, the physical erasing unit is the smallest unit of erasure. That is, each physical erasing unit includes the smallest number of memory cells to be erased together. For example, the physical erasing unit is a physical block.

Figure 5:
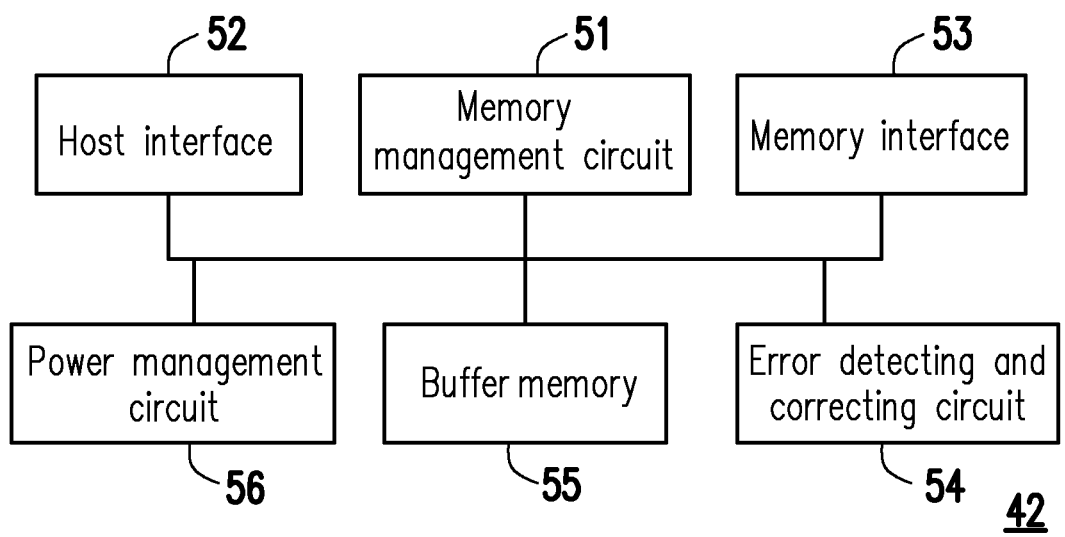
FIG. 5 is a schematic diagram of a memory control circuit unit according to an exemplary embodiment of the disclosure.

FIG. 5 is a schematic diagram of a memory control circuit unit according to an exemplary embodiment of the disclosure.

Please refer to FIG. 5. The memory control circuit unit 42 includes a memory management circuit 51, a host interface 52, and a memory interface 53. The memory management circuit 51 is used to control the overall operation of the memory control circuit unit 42. Specifically, the memory management circuit 51 has multiple control commands, and when the memory storage device 10 is operating, the control commands are executed to perform operations such as data writing, reading, and erasing. The following description of the operation of the memory management circuit 51 is equivalent to the description of the operation of the memory control circuit unit 42.

In an exemplary embodiment, the control commands of the memory management circuit 51 are implemented in the form of firmware. For example, the memory management circuit 51 has a microprocessor unit (not shown) and a read only memory (not shown), and the control commands are burnt into the read only memory. When the memory storage device 10 is operating, the control commands are executed by the microprocessor unit to perform operations such as data writing, reading, and erasing.

In an exemplary embodiment, the control commands of the memory management circuit 51 may also be stored in a specific region (for example, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes the boot code to load the control commands stored in the rewritable non-volatile memory module 43 into the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is used to manage a memory cell or a memory cell group of the rewritable non-volatile memory module 43. The memory write circuit is used to issue a write command sequence to the rewritable non-volatile memory module 43 to write data to the rewritable non-volatile memory module 43. The memory read circuit is used to issue a read command sequence to the rewritable non-volatile memory module 43 to read data from the rewritable non-volatile memory module 43. The memory erase circuit is used to issue an erase command sequence to the rewritable non-volatile memory module 43 to erase data from the rewritable non-volatile memory module 43. The data processing circuit is used to process data to be written to the rewritable non-volatile memory module 43 and data read from the rewritable non-volatile memory module 43. The write command sequence, the read command sequence, and the erase command sequence may each include one or more program codes or command codes and are used to instruct the rewritable non-volatile memory module 43 to execute corresponding operations such as writing, reading, and erasing. In an exemplary embodiment, the memory management circuit 51 may also issue other types of command sequences to the rewritable non-volatile memory module 43 to instruct to execute corresponding operations.

The host interface 52 is coupled to the memory management circuit 51. The memory management circuit 51 may communicate with the host system 11 through the host interface 52. The host interface 52 may be used to receive and identify commands and data sent by the host system 11. For example, the commands and the data sent by the host system 11 may be sent to the memory management circuit 51 through the host interface 52. In addition, the memory management circuit 51 may send the data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used to access the rewritable non-volatile memory module 43. For example, the memory management circuit 51 may access the rewritable non-volatile memory module 43 through the memory interface 53. In other words, data to be written to the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For example, the command sequences may include the write command sequence instructing to write data, the read command sequence instructing to read data, the erase command sequence instructing to erase data, and corresponding command sequences instructing various memory operations (for example, changing a read voltage level, executing a garbage collection operation, etc.). The command sequences are, for example, generated by the memory management circuit 51 and sent to the rewritable non-volatile memory module 43 through the memory interface 53. The command sequences may include one or more signals or data on a bus. The signals or the data may include command codes or program codes. For example, the read command sequence includes information such as a read recognition code and a memory address.

In an exemplary embodiment, the memory control circuit unit 42 further includes an error detecting and correcting circuit 54, a buffer memory 55, and a power management circuit 56.

The error detecting and correcting circuit 54 is coupled to the memory management circuit 51 and is used to execute error detecting and correcting operations to ensure correctness of data. Specifically, when the memory management circuit 51 receives a write command from the host system 11, the error detecting and correcting circuit 54 generates a corresponding error correcting code (ECC) and/or error detecting code (EDC) for data corresponding to the write command, and the memory management circuit 51 writes the data corresponding to the write command and the corresponding error correcting code and/or error detecting code to the rewritable non-volatile memory module 43. Later, when the memory management circuit 51 reads the data from the rewritable non-volatile memory module 43, the error correcting code and/or the error detecting code corresponding to the data are read at the same time, and the error detecting and correcting circuit 54 executes the error detecting and correcting operations on the read data according to the error correcting code and/or the error detecting code.

The buffer memory 55 is coupled to the memory management circuit 51 and is used to temporarily store data. The power management circuit 56 is coupled to the memory management circuit 51 and is used to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
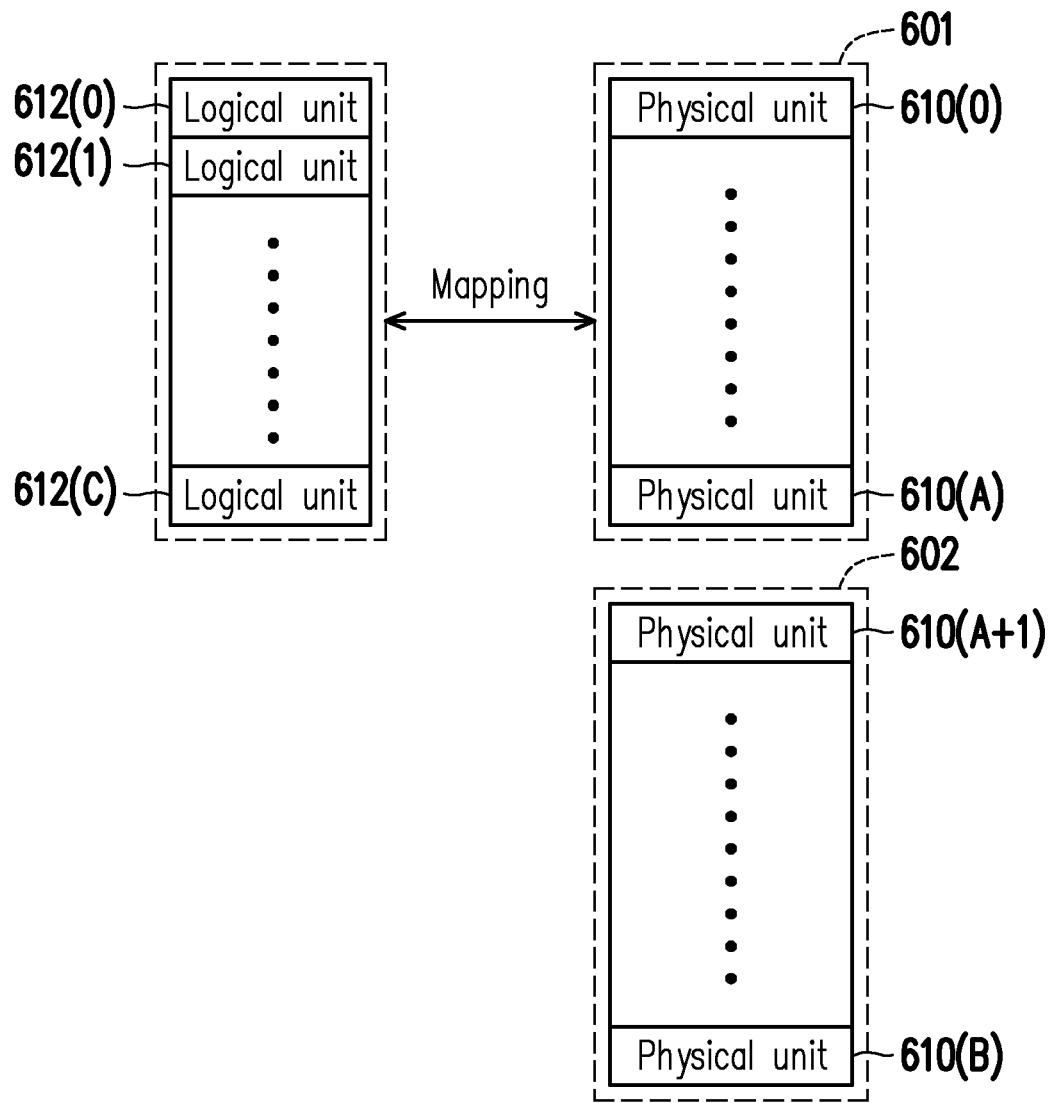
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure.

Please refer to FIG. 6. The memory management circuit 51 may logically group physical units 610(0) to 610(B) in the rewritable non-volatile memory module 43 into a storage area 601 and a spare area 602. Each physical unit may refer to one or more physical erasing units, one or more physical programming units, or other physical management units.

The physical units 610(0) to 610(A) in the storage area 601 are used to store user data (for example, the user data of the host system 11 of FIG. 1). For example, the physical units 610(0) to 610(A) in the storage area 601 may store valid data and invalid data. The physical units 610(A+1) to 610(B) in the spare area 602 do not store data (for example, valid data). For example, if a certain physical unit does not store valid data, the physical unit may be associated (or added) to the spare area 602. In addition, the physical units (or physical units that do not store valid data) in the spare area 602 may be erased. When writing new data, one or more physical units may be extracted from the spare area 602 to store the new data. In an exemplary embodiment, the spare area 602 is also referred to as a free pool.

The memory management circuit 51 may be configured with logical units 612(0) to 612(C) to map the physical units 610(0) to 610(A) in the storage area 601. In an exemplary embodiment, each logical unit corresponds to one logical address. For example, one logical address may include one or more logical block addresses (LBA) or other logical management units. In an exemplary embodiment, one logical unit may also correspond to one logical programming unit or consist of multiple continuous or discontinuous logical addresses. A, B, and C are all positive integers and may be adjusted according to practical requirements, which is not limited in the disclosure.

It should be noted that one logical unit may be mapped to one or more physical units. If a certain physical unit is currently mapped by a certain logical unit, it means that data currently stored in the physical unit includes valid data. Conversely, if a certain physical unit is not currently mapped by any logical unit, it means that data currently stored in the physical unit is invalid data.

The memory management circuit 51 may record management data (also referred to as logical-to-physical mapping information) describing a mapping relationship between the logical unit and the physical unit in at least one logical-to-physical mapping table. When the host system 11 intends to read data from the memory storage device 10 or write data to the memory storage device 10, the memory management circuit 51 may access the rewritable non-volatile memory module 43 according to information in the logical-to-physical mapping table.

Figure 7:
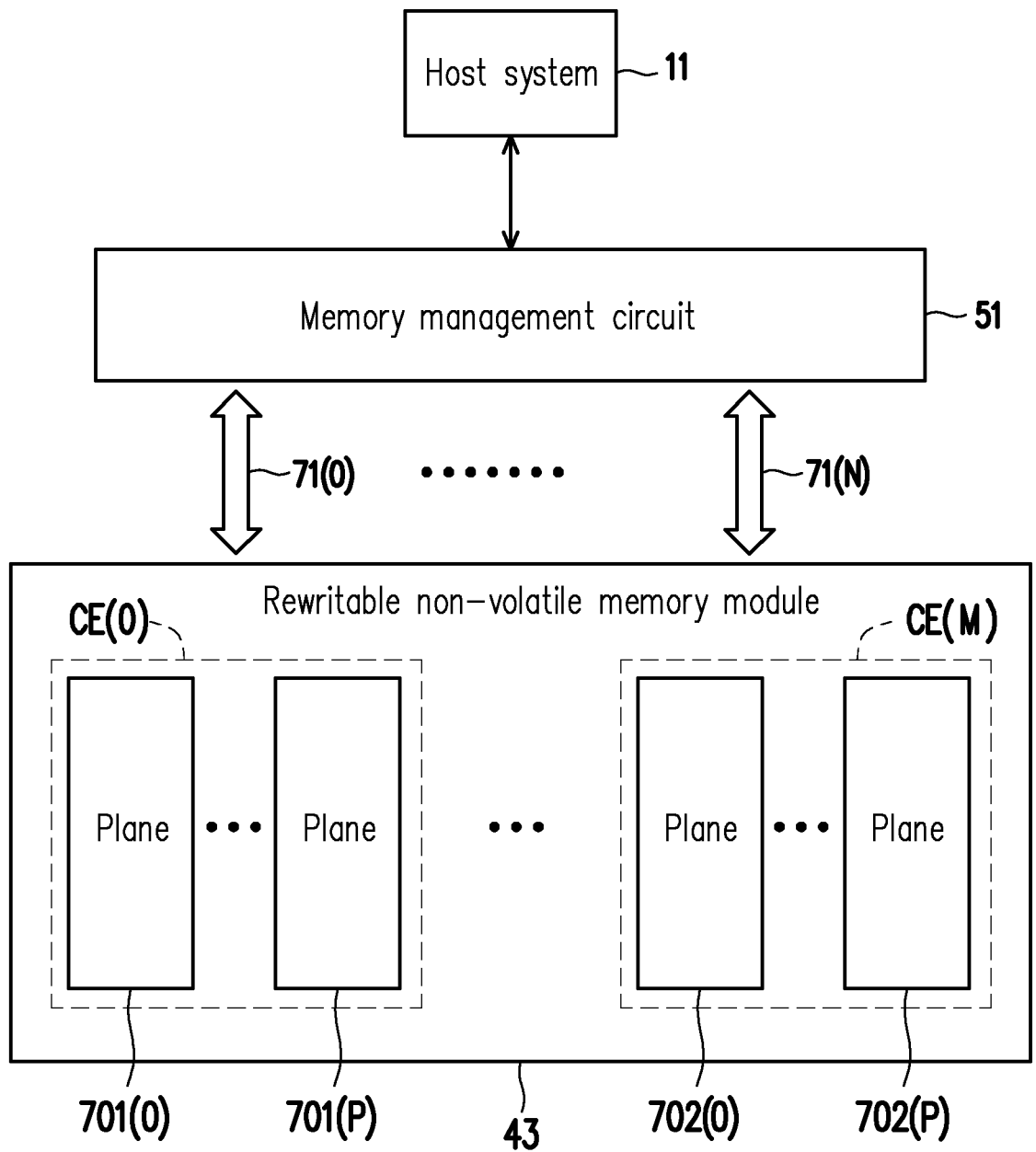
FIG. 7 is a schematic diagram of managing a rewritable non-volatile memory module according to an exemplary embodiment of the disclosure.

FIG. 7 is a schematic diagram of managing a rewritable non-volatile memory module according to an exemplary embodiment of the disclosure.

Please refer to FIG. 7. The rewritable non-volatile memory module 43 may include multiple chip enable (CE) regions CE(0) to CE(M). For example, the rewritable non-volatile memory module 43 may include one or more dies. The die is obtained from a wafer through laser cutting. Each die may be divided into one or more chip enable regions. Each of the chip enable regions CE(0) to CE(M) may include one or more planes (also referred to as memory planes). Each plane may include multiple physical units.

It should be noted that whether a certain chip enable region may be accessed may be controlled through a chip enable signal corresponding to the chip enable region. For example, when the chip enable signal corresponding to the chip enable region CE(i) is pulled up, the rewritable non-volatile memory module 43 may read data from the chip enable region CE(i) or store data in the chip enable region CE(i). However, if the chip enable signal corresponding to the chip enable region CE(i) is not pulled up, the rewritable non-volatile memory module 43 cannot read the data from the chip enable region CE(i) or store the data in the chip enable region CE(i).

It should be noted that in the exemplary embodiment, each of the chip enable regions CE(0) to CE(M) including the same number of (that is, P) planes is taken as an example. For example, the chip enable region CE(0) includes planes 701(0) to 701(P), the chip enable region CE(M) includes planes 702(0) to 702(P), and so on. However, the total number of planes in different chip enable regions may also be different, which is not limited in the disclosure.

The memory management circuit 51 may access the rewritable non-volatile memory module 43 via channels 71(0) to 71(N). In particular, each of the channels 71(0) to 71(N) may be used to access specific one or more chip enable regions. For example, the channel 71(0) may be used to access the chip enable region CE(0) (and the planes 701(0) to 701(P)), the channel 71(N) may be used to access the chip enable region CE(M) (and the planes 702(0) to 702(P)), and so on, and N may be the same as or different from M. In addition, N, M, and P are all positive integers and may be adjusted according to practical requirements, which is not limited in the disclosure.

In an exemplary embodiment, the memory management circuit 51 may receive multiple read commands from the host system 11. The read commands are at least used to instruct to read data (also referred to as first data) stored in a certain plane (also referred to as a first plane) in a certain chip enable region (also referred to as a first chip enable region) and data (also referred to as second data) stored in another plane (also referred to as a second plane) in the same chip enable region (that is, the first chip enable region). For example, the first chip enable region may be the chip enable region CE(0), the first plane may be the plane 701(0), and the second plane may be the plane 701(1), and the disclosure is not limited thereto. In other words, the read commands may be used to read the data in different planes (for example, the plane 701(0) and the plane 701(1)) in the same chip enable region (for example, the chip enable region CE(0)).

In an exemplary embodiment, the memory management circuit 51 may send multiple read command sequences to the rewritable non-volatile memory module 43 according to the read commands. The read command sequences are at least used to instruct to execute a read operation (also referred to as a first read operation) on the first plane to obtain the first data and to execute a read operation (also referred to as a second read operation) on the second plane to obtain the second data. In particular, the data (that is, the first data) read via the first read operation and the data (that is, the second data) read via the second read operation may be temporarily stored in a buffer area inside the rewritable non-volatile memory module 43 (for example, the buffer memory in the rewritable non-volatile memory module 43), and wait to be sent to the memory management circuit 51 (or the memory control circuit unit 42).

In an exemplary embodiment, the memory management circuit 51 may determine a data transmission order according to performance of the first read operation and the second read operation. The data transmission order is used to control, manage, or limit the order of the memory management circuit 51 receiving the first data and the second data from the rewritable non-volatile memory module 43. According to the data transmission order, the memory management circuit 51 may sequentially receive the first data and the second data from the rewritable non-volatile memory module 43 through a customized order. For example, the memory management circuit 51 may sequentially receive the first data and the second data from the rewritable non-volatile memory module 43 through the channel 71(0) based on the data transmission order.

In an exemplary embodiment, the memory management circuit 51 may judge whether the performance of the first read operation is better than the performance of the second read operation. In response to the performance of the first read operation being better than the performance of the second read operation, the memory management circuit 51 may determine the data transmission order to receive the first data first and then the second data. Alternatively, in response to the performance of the second read operation being better than the performance of the first read operation, the memory management circuit 51 may determine the data transmission order to receive the second data first and then the first data. Through preferentially sending the data obtained by the read operation with higher reading performance, the same channel (for example, the channel 71(0)) may be used more effectively for multiple data transmissions, thereby improving the overall data reading performance.

In an exemplary embodiment, the performance of a certain read operation may be reflected by an execution time length of the read operation. The execution time length of a certain read operation may be used to represent the time or the time length required to complete the read operation. For example, the performance of a certain read operation may be negatively correlated to the execution time length of the read operation. If the execution time length of a certain read operation is longer, it means that the efficiency of the read operation is lower. On the contrary, if the execution time length of a certain read operation is shorter, it means that the efficiency of the read operation is higher. Therefore, in an exemplary embodiment, the performance of the first read operation and the performance of the second read operation may be respectively reflected by the execution time length (also referred to as a first execution time length) of the first read operation and the execution time length (also referred to as a second execution time length) of the second read operation.

In an exemplary embodiment, the memory management circuit 51 may respectively evaluate the performance of the first read operation and the performance of the second read operation according to the first execution time length and the second execution time length. The memory management circuit 51 may compare the first execution time length with the second execution time length. In response to the first execution time length being shorter than the second execution time length, the memory management circuit 51 may judge that the performance of the first read operation is better than the performance of the second read operation. Alternatively, in response to the second execution time length being shorter than the first execution time length, the memory management circuit 51 may judge that the performance of the second read operation is better than the performance of the first read operation.

In an exemplary embodiment, the memory management circuit 51 may obtain a type (also referred to as a first type) of a physical unit (also referred to as a first physical unit) storing the first data in the first plane and obtain a type (also referred to as a second type) of a physical unit (also referred to as a second physical unit) storing the second data in the second plane. The memory management circuit 51 may evaluate the performance of the first read operation and the second read operation according to the first type and the second type. For example, the memory management circuit 51 may record the execution time lengths of the read operations corresponding to different types of physical units in a data table in advance. Afterwards, the memory management circuit 51 may query the data table according to the type of the physical unit to be read to obtain the execution time length of the read operation corresponding to the type of the physical unit.

In an exemplary embodiment, the memory management circuit 51 may obtain the corresponding first execution time length according to the type (that is, the first type) of the first physical unit. At the same time, the memory management circuit 51 may obtain the corresponding second execution time length according to the type (that is, second type) of the second physical unit. The first type may be the same as or different from the second type. The memory management circuit 51 may evaluate the performance of the first read operation and the second read operation according to the first execution time length and the second execution time length. Then, the memory management circuit 51 may determine the data transmission order according to a performance evaluation result.

In an exemplary embodiment, the type of a physical unit may reflect whether the physical unit belongs to an upper physical programming unit, a middle physical programming unit, or a lower physical programming unit. In an exemplary embodiment, the upper physical programming unit is also referred to as an upper page, the middle physical programming unit is also referred to as a middle page, and the lower physical programming unit is also referred to as a lower page. However, the type of the physical unit may also be classified according to other rules, such as using the type of data stored in the physical unit, the frequency of accessing the physical unit, the degree of loss of the physical unit, and/or the bit error rate of the data stored in the physical unit for classification, which is not limited in the disclosure.

In an exemplary embodiment, the type of a physical unit may reflect a sorting position of a bit stored in the physical unit among multiple bits stored in a memory cell. Alternatively, in an exemplary embodiment, the memory management circuit 51 may determine the type of the physical unit according to the sorting position of the bit stored in the physical unit among the bits stored in the memory cell. For example, it is assumed that one memory cell may store n bits. The memory management circuit 51 may determine the type of the physical unit according to that the bit stored in the physical unit belonging to an i-th bit among the n bits, for example, determine that the physical unit belongs to the upper physical programming unit, the middle physical programming unit, the lower physical programming units, or other types of physical programming units.

In an exemplary embodiment, a sorting position of a bit stored in a first physical unit of a first type among multiple bits stored in a memory cell may be different from a sorting position of a bit stored in a second physical unit of a second type among the bits stored in the memory cell. For example, it is assumed that one memory cell may store n bits. If the bit stored in the first physical unit belongs to the i-th bit among the n bits, the bit stored in the second physical unit belongs to a j-th bit among the n bits, and i is not equal to j, the memory management circuit 51 may judge that the type (that is, the first type) of the first physical unit is different from the type (that is, the second type) of the second physical unit. Then, the memory management circuit 51 may respectively evaluate the performance of the first read operation and the second read operation according to the respective types of the first physical unit and the second physical unit. Alternatively, in an exemplary embodiment, if i is equal to j, the memory management circuit 51 may judge that the type (that is, the first type) of the first physical unit is the same as the type (that is, the second type) of the second physical unit.

In an example embodiment, the execution time length of the read operation for the lower physical programming unit may be shorter than the execution time length of the read operation for the upper physical programming unit, and/or the execution time length of the read operation for the upper physical programming unit may be shorter than the execution time length of the read operation for the middle physical programming unit. Therefore, in an example embodiment, the performance of the read operation for the lower physical programming unit may be better than the performance of the read operation for the upper physical programming unit, and/or the performance of the read operation for the upper physical programming unit may be better than the performance of the read operation for the middle physical programming unit. However, the evaluation manner of the performance for different types of physical units may also be adjusted according to practical requirements, which is not limited in the disclosure.

In an exemplary embodiment, after temporarily storing the first data obtained via the first read operation and the second data obtained via the second read operation in the buffer area in the rewritable non-volatile memory module 43, according to the determined data transmission order, the memory management circuit 51 may sequentially send multiple direct memory access (DMA) command sequences to the rewritable non-volatile memory module 43. The direct memory access command sequences may be at least used to instruct the rewritable non-volatile memory module 43 to sequentially send the first data and the second data in the buffer area according to the determined data transmission order.

In an exemplary embodiment, it is assumed that the read commands received from the host system 11 include a first read command and a second read command. The first read command is used to instruct to read the data (that is, the first data) of a certain logical unit (also referred to as a first logical unit). The first logical unit is mapped to the first physical unit in the first plane. The second read command is used to instruct to read the data (that is, the second data) of another logical unit (also referred to as a second logical unit). The second logical unit is mapped to the second physical unit in the second plane. The first plane and the second plane are both located in the first chip enable region.

According to the first read command, the memory management circuit 51 may send a read command sequence (also referred to as a first read command sequence) to the rewritable non-volatile memory module 43. The first read command sequence may be used to instruct the rewritable non-volatile memory module 43 to read the first data from the first physical unit in the first plane. In addition, according to the second read command, the memory management circuit 51 may send another read command sequence (also referred to as a second read command sequence) to the rewritable non-volatile memory module 43. The second read command sequence may be used to instruct the rewritable non-volatile memory module 43 to read the second data from the second physical unit in the second plane.

According to the first read command sequence, the rewritable non-volatile memory module 43 may execute the first read operation on the first physical unit to obtain the first data and temporarily store the first data in the buffer area in the rewritable non-volatile memory module 43. In addition, according to the second read command sequence, the rewritable non-volatile memory module 43 may execute the second read operation on the second physical unit to obtain the second data and temporarily store the second data in the buffer area. Then, the rewritable non-volatile memory module 43 may start to wait for the direct memory access command sequence corresponding to the first read operation (or the first read command sequence) and/or the second read operation (or the second read command sequence).

In an exemplary embodiment, assuming that the determined data transmission order is to receive the first data first and then receive the second data, according to the data transmission order, the memory management circuit 51 may first send the direct memory access command sequence (also referred to as a first direct memory access command sequence) corresponding to the first read operation (or the first read command) to the rewritable non-volatile memory module 43, and then send the direct memory access command sequence (also referred to as a second direct memory access command sequence) corresponding to the second read operation (or the second read command) to the rewritable non-volatile memory module 43. In response to the first received first direct memory access command sequence, the rewritable non-volatile memory module 43 may first send the first data in the buffer area to the memory management circuit 51, for example, via the channel 71(0). Then, in response to the later received second direct memory access command sequence, after sending the first data, the rewritable non-volatile memory module 43 may continue to send the second data in the buffer area to the memory management circuit 51, for example, via the same channel 71(0). On the contrary, if the determined data transmission order is to receive the second data first and then receive the first data, according to the data transmission order, the memory management circuit 51 may first send the second direct memory access command sequence to the rewritable non-volatile memory module 43, and then send the first direct memory access command sequence to the rewritable non-volatile memory module 43. Then, the rewritable non-volatile memory module 43 may send the second data first and then the first data according to the data transmission order.

In an exemplary embodiment, the memory management circuit 51 may temporarily store the received read commands in at least one command queue. In particular, the total number of the at least one command queue may be less than the total number of planes in a single chip enable region. Taking FIG. 7 as an example, assuming that the total number of planes in a single chip enable region is P, the total number of the at least one command queue may be Q, and Q is less than P. For example, P may be 4, 6, or 8, Q may be 2, and the values of P and Q may be adjusted according to practical requirements.

In an exemplary embodiment, the memory management circuit 51 may temporarily store the first read command and the second read command in the same command queue among the at least one command queue (also referred to as a first command queue). The memory management circuit 51 may analyze the read commands (that is, the first read command and the second read command) in the first command queue without crossing the command queues to evaluate the performance of the read operations executed corresponding to the read commands. After sending the read command sequence (that is, the first read command sequence and the second read command sequence), the memory management circuit 51 may determine the data transmission order according to the performance evaluation result and sequentially receive the data to be read (that is, the first data and the second data) according to the data transmission order. The relevant operation details have been described in detail above and will not be repeated here.

In an exemplary embodiment, the memory management circuit 51 may also temporarily store the first read command and the second read command in different command queues among the at least one command queue. For example, the memory management circuit 51 may temporarily store the first read command in a certain command queue (that is, the first command queue) among the at least one command queue and temporarily store the second read command in another command queue (that is, the second command queue) among the at least one command queue. Afterwards, the memory management circuit 51 may analyze the read commands (that is, the first read command and the second read command) in the command queues in a manner of crossing the command queues to evaluate the performance of the read operations executed corresponding to the read commands. Then, the memory management circuit 51 may determine the data transmission order according to the performance evaluation result and sequentially receive the first data and the second data according to the data transmission order. The relevant operation details have been described in detail above and will not be repeated here.

In an exemplary embodiment, the memory management circuit 51 may determine to temporarily store the read command in a specific command queue according to the plane where the physical unit instructed to be read by the read command is at. For example, in response to the first read command being used to read data from the first plane, the memory management circuit 51 may temporarily store the first read command in the first command queue. In addition, in response to the second read command being used to read data from the second plane, the memory management circuit 51 may temporarily store the second read command in the second command queue.

In an exemplary embodiment, after determining the data transmission order, the memory management circuit 51 may record information reflecting the data transmission order. For example, the memory management circuit 51 may temporarily store the information reflecting the data transmission order in the buffer memory 55 of FIG. 5. Then, under the premise of not adjusting the sort of the read commands temporarily stored in the command queue, the memory management circuit 51 may sequentially receive the first data and the second data from the rewritable non-volatile memory module 43 according to the data transmission order.

Figure 8:
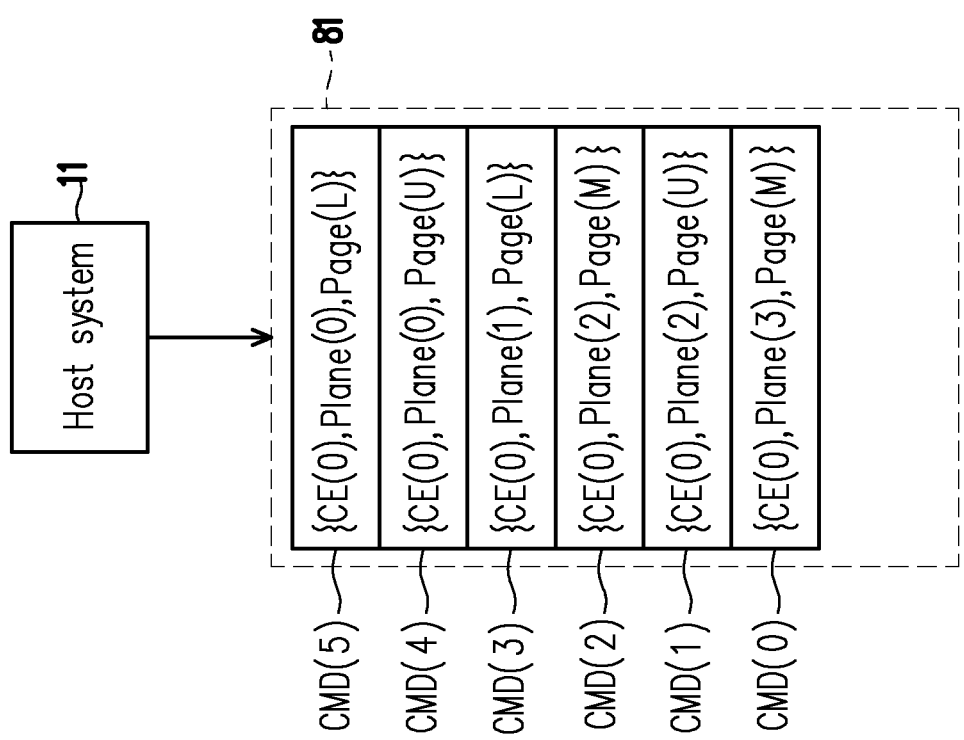
FIG. 8 is a schematic diagram of temporarily storing multiple read commands in a command queue according to an exemplary embodiment of the disclosure.

FIG. 8 is a schematic diagram of temporarily storing multiple read commands in a command queue according to an exemplary embodiment of the disclosure.

Please refer to FIG. 8. It is assumed that the read commands from the host system 11 include read commands CMD(0) to CMD(5). The read commands CMD(0) to CMD(5) may be temporarily stored in a command queue 81. For example, the read commands CMD(0) to CMD(5) are sorted in the command queue 81 in a first in first out (FIFO) manner. The read command CMD(0) is used to instruct to read data from a physical programming unit (labeled as page (M)) in a plane (3) in the chip enable region CE(0). The read command CMD(1) is used to instruct to read data from an upper physical programming unit (labeled page (U)) in a plane (2) in the chip enable region CE(0). The read command CMD(2) is used to instruct to read data from a middle physical programming unit in the plane (2) in the chip enable region CE(0). The read command CMD(3) is used to instruct to read data from a lower physical programming unit (labeled page (L)) in a plane (1) in the chip enable region CE(0). The read command CMD(4) is used to instruct to read data from an upper physical programming unit in a plane (0) in the chip enable region CE(0). The read command CMD(5) is used to instruct to read data from a lower physical programming unit in the plane (0) in the chip enable region CE(0). It should be noted that the total number of the read commands CMD(0) to CMD(5), the plane accessed by each read command, and the type of the physical unit instructed to be accessed by each read command are all examples, which is not limited by the disclosure.

Figure 9:
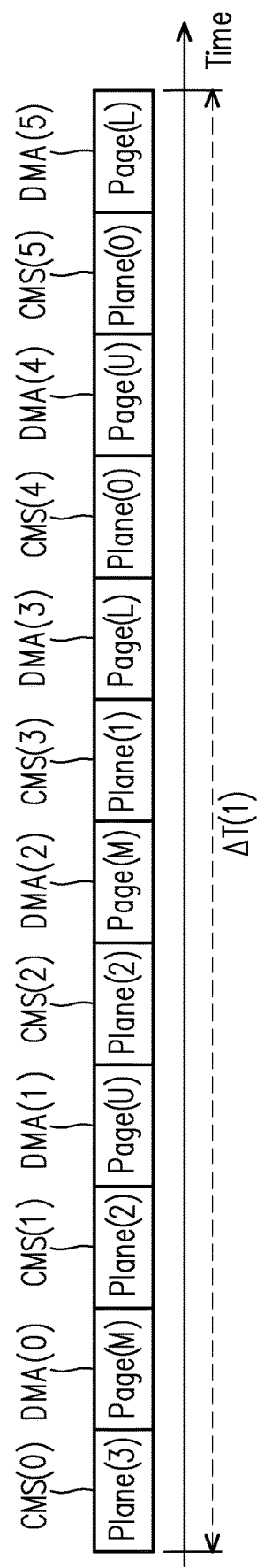
FIG. 9 is a schematic diagram of sending a read command sequence and a direct memory access command sequence according to a preset rule according to an exemplary embodiment of the disclosure.

FIG. 9 is a schematic diagram of sending a read command sequence and a direct memory access command sequence according to a preset rule according to an exemplary embodiment of the disclosure.

Please refer to FIG. 8 and FIG. 9. In an exemplary embodiment, the memory management circuit 51 may sequentially send the read command sequences CMS(0) to CMS(5) and direct memory access command sequences DMA(0) to DMA(5) to the rewritable non-volatile memory module 43 according to the preset rule and the read commands CMD(0) to CMD(5) in the command queue 81 to read the required data. The specific transmission order of the command sequences is shown in FIG. 9.

It should be noted that a read command sequence CMS(i) and a direct memory access command sequence DMA(i) are generated according to a read command (i). According to the read command sequence CMS(i), the rewritable non-volatile memory module 43 may execute a read operation (i) corresponding to a read command CMD(i) and temporarily store read data (i) in the buffer area inside the rewritable non-volatile memory module 43. Then, according to the direct memory access command sequence DMA(i), the rewritable non-volatile memory module 43 may send the data (i) from the buffer area and sequentially send the data (i) to the memory management circuit 51. It should be noted that in the exemplary embodiment of FIG. 9, the time length spent to complete the entire data read operation corresponding to the read commands CMD(0) to CMD(5) may be represented by $\Delta T(1)$.

Figure 10:
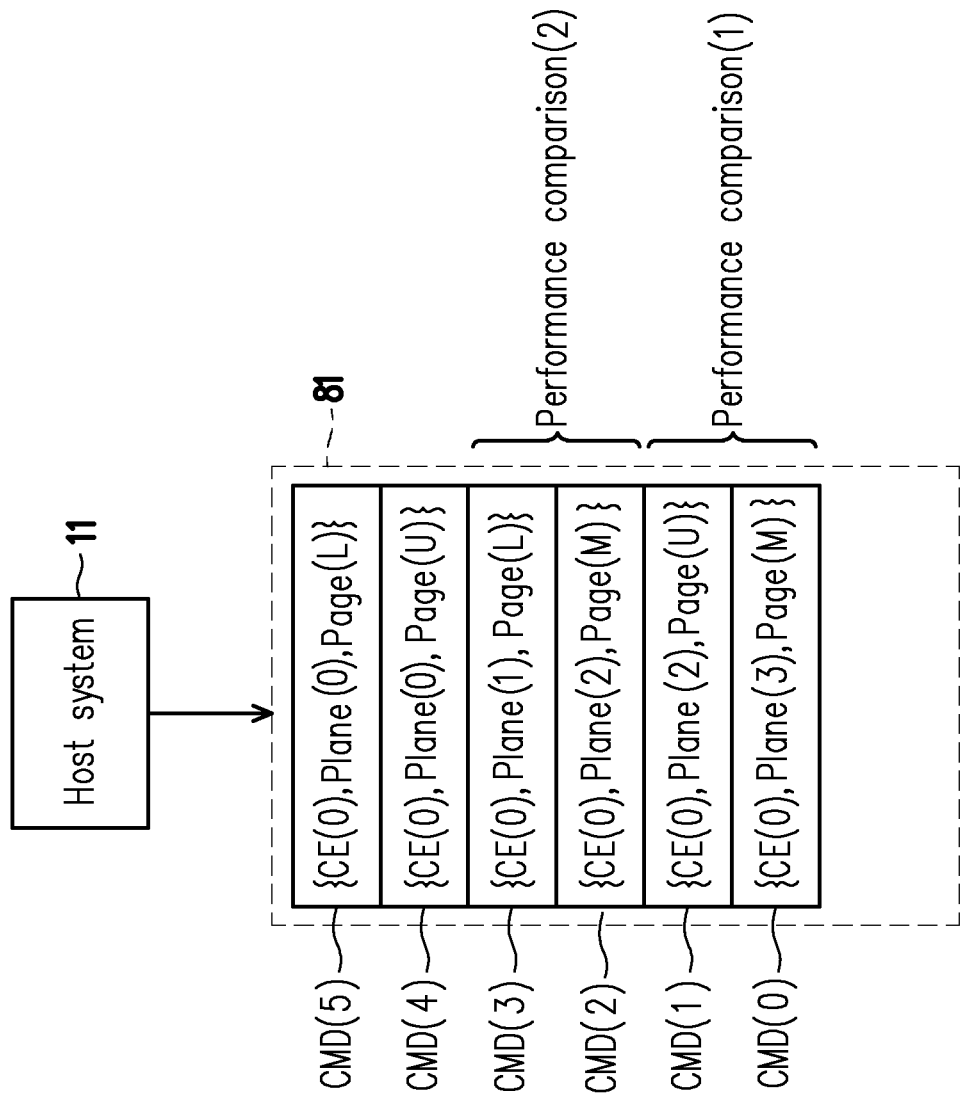
FIG. 10 is a schematic diagram of performance comparison between temporarily storing multiple read commands in a command queue and executing multiple read operations according to an exemplary embodiment of the disclosure.

FIG. 10 is a schematic diagram of performance comparison between temporarily storing multiple read commands in a command queue and executing multiple read operations according to an exemplary embodiment of the disclosure.

Please refer to FIG. 10. In an exemplary embodiment, the memory management circuit 51 may execute performance comparison (1) on the read operations respectively corresponding to the read commands CMD(0) and CMD(1). For example, in the performance comparison (1), the memory management circuit 51 may compare the execution time lengths of the read operations respectively corresponding to the read commands CMD(0) and CMD(1). In addition, the memory management circuit 51 may execute performance comparison (2) on the read operations respectively corresponding to the read commands CMD(2) and CMD(3). For example, in the performance comparison (2), the memory management circuit 51 may compare the execution time lengths of the read operations respectively corresponding to the read commands CMD(2) and CMD(3).

Figure 11:
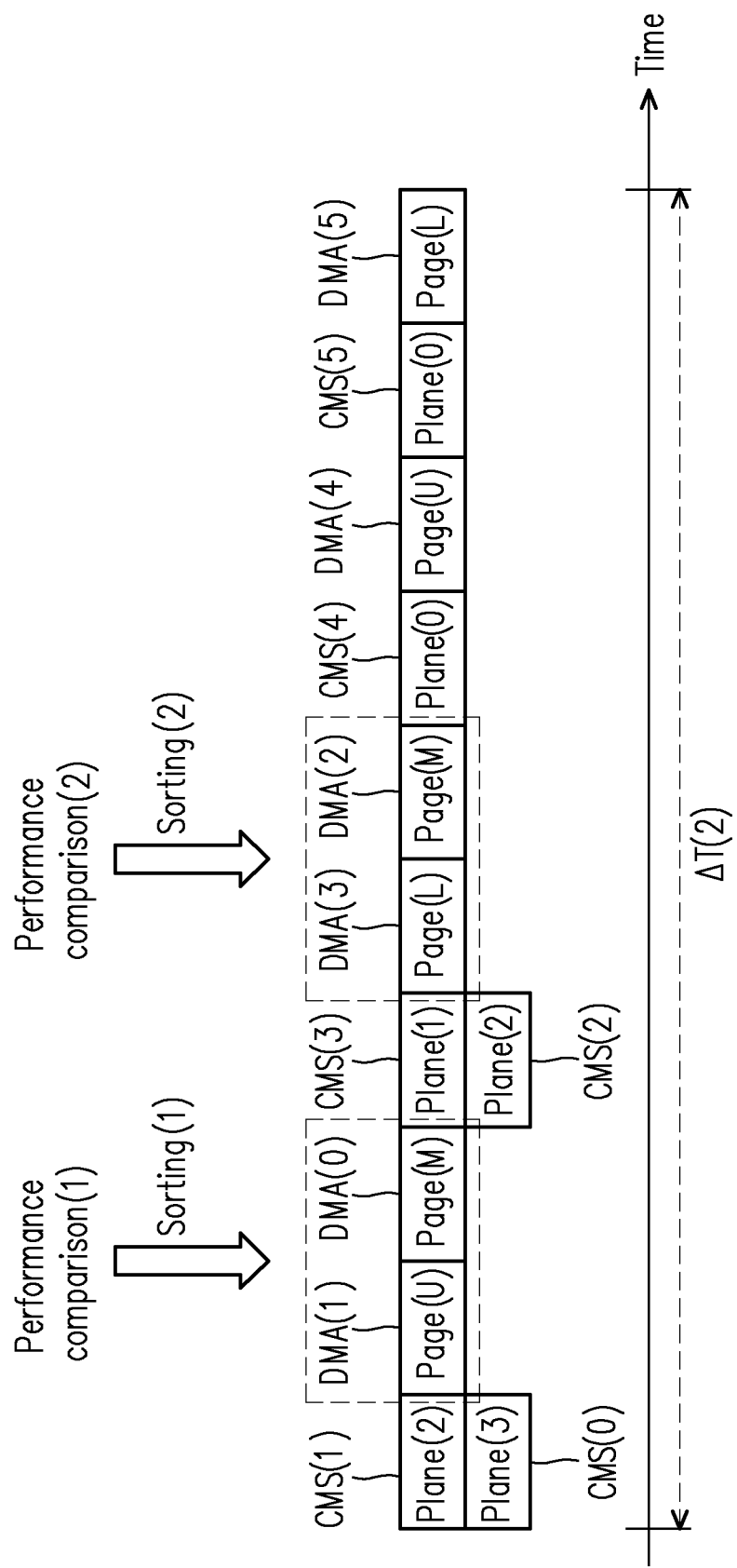
FIG. 11 is a schematic diagram of sending a read command sequence and a direct memory access command sequence according to a performance comparison result according to an exemplary embodiment of the disclosure.

FIG. 11 is a schematic diagram of sending a read command sequence and a direct memory access command sequence according to a performance comparison result according to an exemplary embodiment of the disclosure.

Please refer to FIG. 10 and FIG. 11. The memory management circuit 51 may continuously send the read command sequences CMS(0) and CMS(1) to the rewritable non-volatile memory module 43 according to the read commands CMD(0) and CMD(1) in the command queue 81. In response to the read command sequences CMS(0) and CMS(1), the plane (2) and the plane (3) in the chip enable region CE(0) may simultaneously or sequentially enter a busy state to execute the corresponding read operations. Then, the rewritable non-volatile memory module 43 may store the read data in the buffer area inside the rewritable non-volatile memory module 43.

On the other hand, according to a comparison result of the performance comparison (1), the memory management circuit 51 may execute sorting (1) on the direct memory access command sequences DMA(0) and DMA(1). According to a sorting result of the sorting (1), the memory management circuit 51 may sequentially send the direct memory access command sequences DMA(1) and DMA(0) to the rewritable non-volatile memory module 43. For example, in response to the performance of reading data from the upper physical programming unit being better than the performance of reading data from the middle physical programming unit, the direct memory access command sequence DMA(1) may be sent to the rewritable non-volatile memory module 43 prior to DMA(0). In this way, the data that has been read first may be returned to the memory management circuit 51, thereby preventing the bandwidth of the channel 71(0) from being wasted.

After completing the read commands CMD(0) and CMD(1), the memory management circuit 51 may continuously send the read command sequences CMS(2) and CMS(3) to the rewritable non-volatile memory module 43 according to the read commands CMD(2) and CMD(3) in the command sequence 81. In response to the read command sequences CMS(2) and CMS(3), the plane (1) and the plane (2) in the chip enable region CE(0) may simultaneously or sequentially enter the busy state to execute the corresponding read operations. Then, the rewritable non-volatile memory module 43 may store the read data in the buffer area inside the rewritable non-volatile memory module 43.

On the other hand, according to a comparison result of the performance comparison (2), the memory management circuit 51 may execute sorting (2) on the direct memory access command sequences DMA(2) and DMA(3). According to a sorting result of the sorting (2), the memory management circuit 51 may sequentially send the direct memory access command sequences DMA(3) and DMA(2) to the rewritable non-volatile memory module 43. For example, in response to the performance of reading data from the lower physical programming unit being better than the performance of reading data from the middle physical programming unit, the direct memory access command sequence DMA(3) may be sent to the rewritable non-volatile memory module 43 prior to DMA(2). In this way, the data that has been read first may be returned to the memory management circuit 51, thereby preventing the bandwidth of the channel 71(0) from being wasted.

After completing the read commands CMD(2) and CMD(3), the memory management circuit 51 may sequentially send the read command sequences CMS (4) and CMS (5) and the direct memory access command sequences DMA(4) and DMA(5) to the rewritable non-volatile memory module 43 according to the remaining read commands CMD(4) and CMD(5) in the command queue 81 to read the required data. The specific transmission order of the command sequences is shown in FIG. 11.

It should be noted that in the exemplary embodiment of FIG. 11, the time length spent to complete the entire data read operation corresponding to the read commands CMD (0) to CMD(5) may be represented by ΔT(2). In particular, in the absence of special interference, ΔT(2) may be less than ΔT(1), thereby improving the data reading performance.

Figure 12:
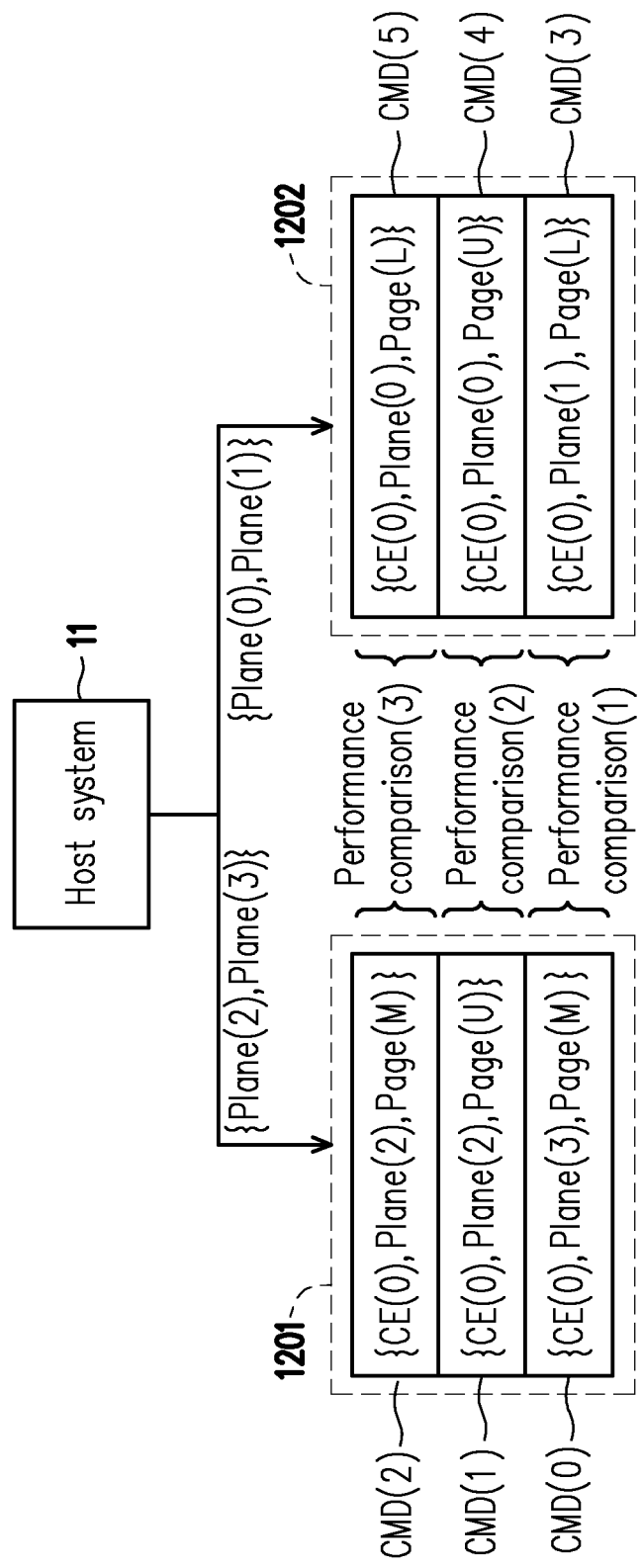
FIG. 12 is a schematic diagram of performance comparison between temporarily storing multiple read commands in multiple command queues and executing multiple read operations according to an exemplary embodiment of the disclosure.

FIG. 12 is a schematic diagram of performance comparison between temporarily storing multiple read commands in multiple command queues and executing multiple read operations according to an exemplary embodiment of the disclosure.

Please refer to FIG. 12. In an exemplary embodiment, the memory management circuit 51 may temporarily store the read command CMD(i) in one of command queues 1201 and 1202 according to the plane to be read by the read command CMD(i). For example, in response to the planes to be read by the read commands CMD(0) to CMD(2) being the plane (2) and the plane (3) in the chip enable region CE(0), the memory management circuit 51 may store the read commands CMD(0) to CMD(2) in the command queue 1201. In addition, in response to the planes to be read by the read commands CMD(3) to CMD(5) being the plane (0) and the plane (1) in the chip enable region CE(0), the memory management circuit 51 may store the read commands CMD (3) to CMD(5) in the command queue 1202.

The memory management circuit 51 may execute the performance comparison (1) across the command queues for the read operations respectively corresponding to the read commands CMD(0) and CMD(3). For example, in the performance comparison (1), the memory management circuit 51 may compare the execution time lengths of the read operations respectively corresponding to the read commands CMD(0) and CMD(3). Similarly, the memory management circuit 51 may execute the performance comparison (2) across the command queues for the read operations respectively corresponding to the read commands CMD(1) and CMD(4). For example, in the performance comparison (2), the memory management circuit 51 may compare the execution time lengths of the read operations respectively corresponding to the read commands CMD(1) and CMD(4). Similarly, the memory management circuit 51 may execute performance comparison (3) across the command queues for the read operations respectively corresponding to the read commands CMD(2) and CMD(5). For example, in the performance comparison (3), the memory management circuit 51 may compare the execution time lengths of the read operations respectively corresponding to the read commands CMD(2) and CMD(5).

Figure 13:
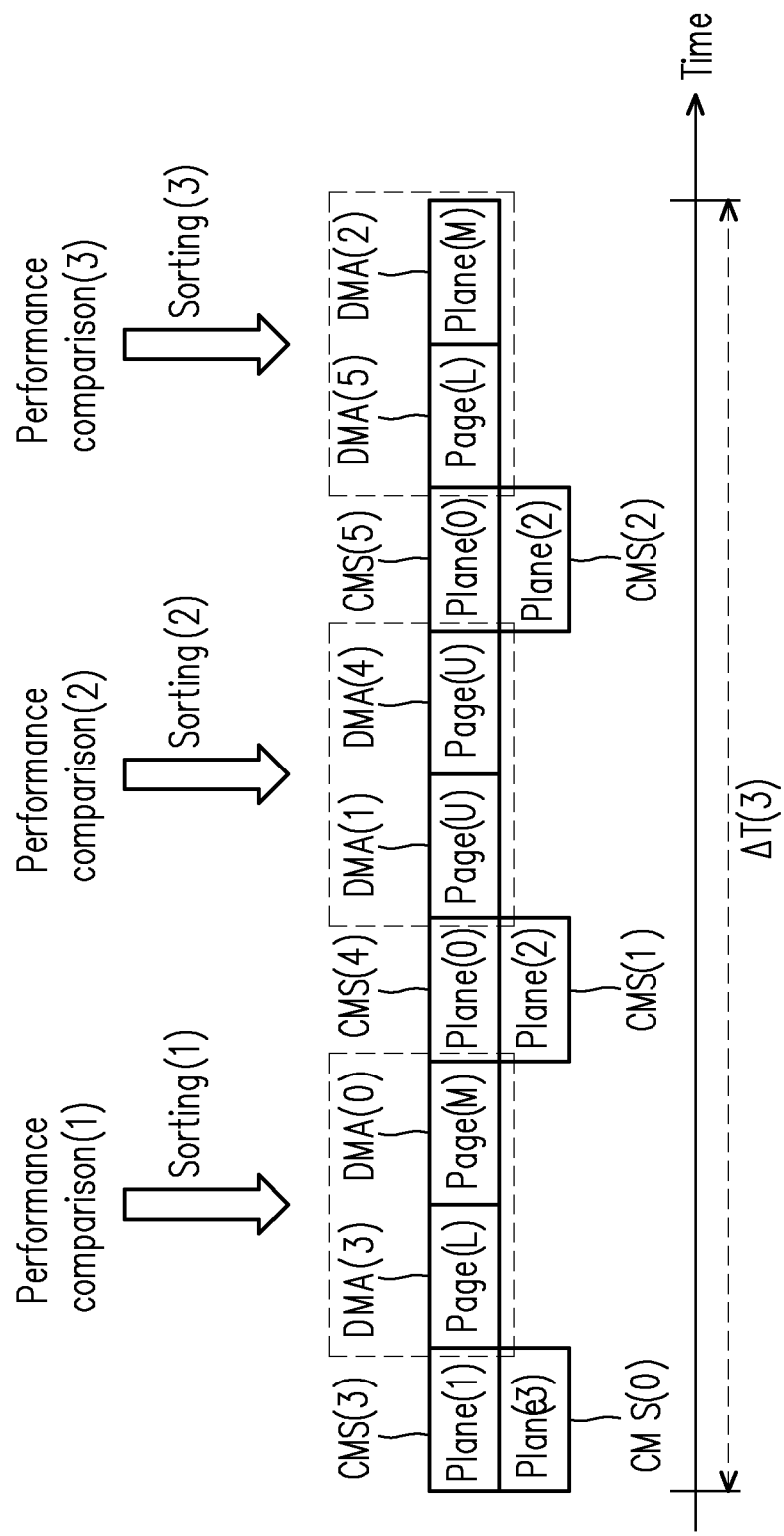
FIG. 13 is a schematic diagram of sending a read command sequence and a direct memory access command sequence according to a performance comparison result according to an exemplary embodiment of the disclosure.

FIG. 13 is a schematic diagram of sending a read command sequence and a direct memory access command sequence according to a performance comparison result according to an exemplary embodiment of the disclosure.

Please refer to FIG. 12 and FIG. 13. The memory management circuit 51 may continuously send the read command sequences CMS(0) and CMS(3) to the rewritable non-volatile memory module 43 according to the read commands CMD(0) and CMD(3) in the command sequences 1201 and 1202. In response to the read command sequences CMS(0) and CMS(3), the plane (1) and the plane (3) in the chip enable region CE(0) may simultaneously or sequentially enter the busy state to execute the corresponding read operations. Then, the rewritable non-volatile memory module 43 may store the read data in the buffer area inside the rewritable non-volatile memory module 43.

On the other hand, according to the comparison result of the performance comparison (1), the memory management circuit 51 may execute the sorting (1) on the direct memory access command sequences DMA(0) and DMA(3). According to the sorting result of the sorting (1), the memory management circuit 51 may sequentially send the direct memory access command sequences DMA(3) and DMA(0) to the rewritable non-volatile memory module 43. For example, in response to the performance of reading data from the lower physical programming unit being better than the performance of reading data from the middle physical programming unit, the direct memory access command sequence DMA(3) may be sent to the rewritable non-volatile memory module 43 prior to DMA(0). In this way, the data that has been read first may be returned to the memory management circuit 51, thereby preventing the bandwidth of the channel 71(0) from being wasted.

After completing the read commands CMD(0) and CMD(3), the memory management circuit 51 may continuously send the read command sequences CMS(1) and CMS (4) to the rewritable non-volatile memory module 43 according to the read commands CMD(1) and CMD(4) in the command sequences 1201 and 1202. In response to the read command sequences CMS(1) and CMS(4), the plane (0) and the plane (2) in the chip enable region CE(0) may simultaneously or sequentially enter the busy state to execute the corresponding read operations. Then, the rewritable non-volatile memory module 43 may store the read data in the buffer area inside the rewritable non-volatile memory module 43.

On the other hand, according to the comparison result of the performance comparison (2), the memory management circuit 51 may execute the sorting (2) on the direct memory access command sequences DMA(1) and DMA(4). According to the sorting result of the sorting (2), the memory management circuit 51 may sequentially send the direct memory access command sequences DMA(1) and DMA(4) to the rewritable non-volatile memory module 43. It should be noted that in this example, the read commands CMD(1) and CMD(4) both read data for the upper physical programming unit, so there is no difference in the reading performance between the two. Therefore, the direct memory access command sequence DMA(1) may be sent to the rewritable non-volatile memory module 43 prior to or after DMA(4). Whether the direct memory access command sequence DMA(1) or DMA(4) is sent first, the bandwidth of the channel 71(0) is not affected.

After completing the read commands CMD(1) and CMD(4), the memory management circuit 51 may continuously send the read command sequences CMS(2) and CMS (5) to the rewritable non-volatile memory module 43 according to the read commands CMD(2) and CMD(5) in the command sequences 1201 and 1202. In response to the read command sequences CMS(2) and CMS(5), the plane (0) and the plane (2) in the chip enable region CE(0) may simultaneously or sequentially enter the busy state to execute the corresponding read operations. Then, the rewritable non-volatile memory module 43 may store the read data in the buffer area inside the rewritable non-volatile memory module 43.

On the other hand, according to a comparison result of the performance comparison (3), the memory management circuit 51 may execute sorting (3) on the direct memory access command sequences DMA(2) and DMA(5). According to a sorting result of the sorting (3), the memory management circuit 51 may sequentially send the direct memory access command sequences DMA(5) and DMA(2) to the rewritable non-volatile memory module 43. For example, in response to the performance of reading data from the lower physical programming unit being better than the performance of reading data from the middle physical programming unit, the direct memory access command sequence DMA(5) may be sent to the rewritable non-volatile memory module 43 prior to DMA(2). In this way, the data that has been read first may be returned to the memory management circuit 51, thereby preventing the bandwidth of the channel 71(0) from being wasted. The specific transmission order of the command sequences is shown in FIG. 13.

It should be noted that in the exemplary embodiment of FIG. 13, the time length spent to complete the entire data read operation corresponding to the read commands CMD (0) to CMD(5) may be represented by $\Delta T(3)$. In particular, in the absence of special interference, $\Delta T(3)$ may be less than $\Delta T(2)$, thereby improving the data reading performance.

Figure 14:
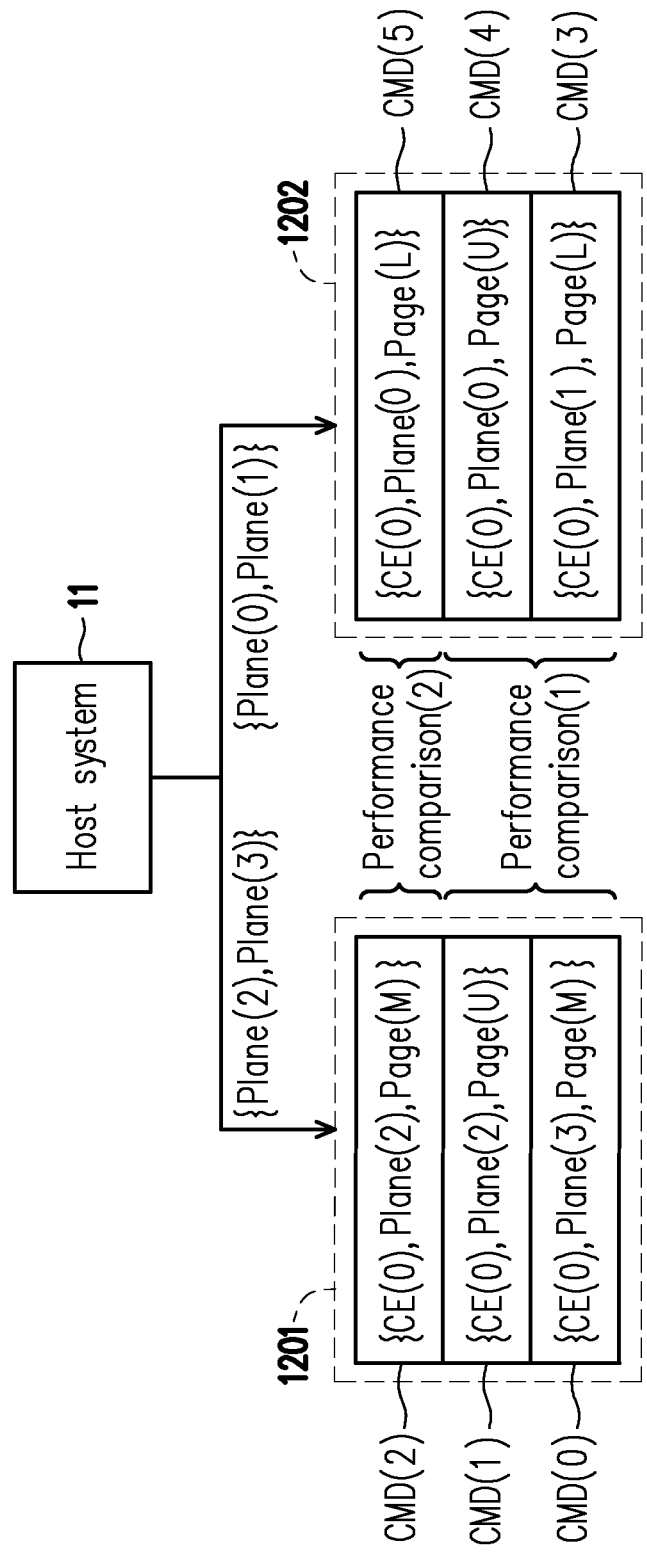
FIG. 14 is a schematic diagram of performance comparison between temporarily storing multiple read commands in multiple command queues and executing multiple read operations according to an exemplary embodiment of the disclosure.

FIG. 14 is a schematic diagram of performance comparison between temporarily storing multiple read commands in multiple command queues and executing multiple read operations according to an exemplary embodiment of the disclosure.

Please refer to FIG. 14. In an exemplary embodiment, the memory management circuit 51 may execute the performance comparison (1) across the command queues for the read operations respectively corresponding to the read commands CMD(0), CMD(1), CMD(3), and CMD(4). For example, in the performance comparison (1), the memory management circuit 51 may compare the execution time lengths of the read operations respectively corresponding to the read commands CMD(0), CMD(1), CMD(3), and CMD (4). Similarly, the memory management circuit 51 may execute the performance comparison (2) across the command queues for the read operations respectively corresponding to the read commands CMD(2) and CMD(5). For example, in the performance comparison (2), the memory management circuit 51 may compare the execution time lengths of the read operations respectively corresponding to the read commands CMD(2) and CMD(5).

Figure 15:
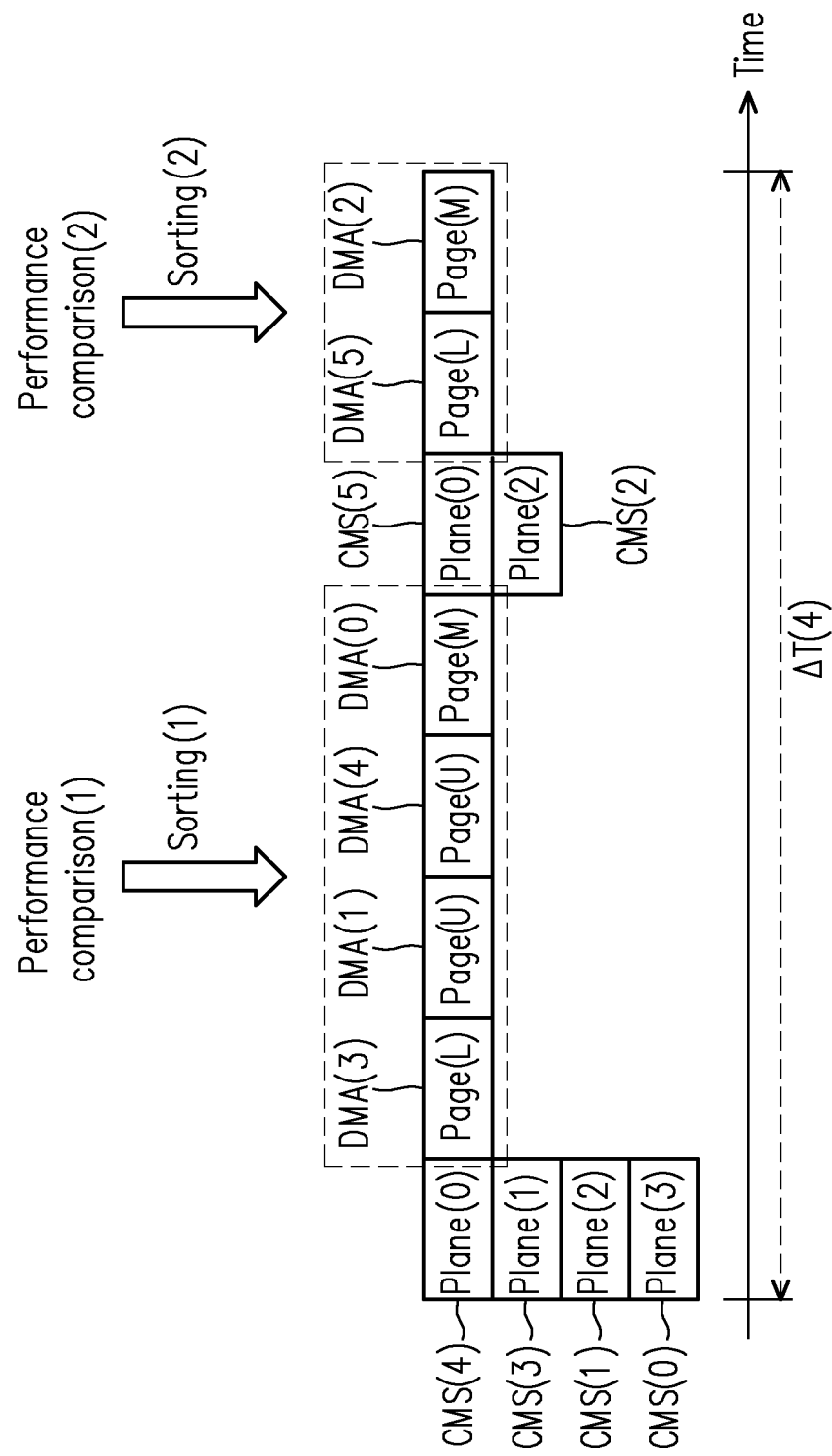
FIG. 15 is a schematic diagram of sending a read command sequence and a direct memory access command sequence according to a performance comparison result according to an exemplary embodiment of the disclosure.

FIG. 15 is a schematic diagram of sending a read command sequence and a direct memory access command sequence according to a performance comparison result according to an exemplary embodiment of the disclosure.

Please refer to FIG. 14 and FIG. 15. The memory management circuit 51 may continuously send read command sequences CMS(0), CMS(1), CMS(3), and CMS(4) to the rewritable non-volatile memory module 43 according to the read commands CMD(0), CMD(1), CMD(3), and CMD(4) in the command sequences 1201 and 1202. In response to the read command sequences CMS(0), CMS(1), CMS(3), and CMS(4), the plane (0) to the plane (3) in the chip enable region CE(0) may simultaneously or sequentially enter the busy state to execute the corresponding read operations. Then, the rewritable non-volatile memory module 43 may store the read data in the buffer area inside the rewritable non-volatile memory module 43.

On the other hand, according to the comparison result of the performance comparison (1), the memory management circuit 51 may execute the sorting (1) on the direct memory access command sequences DMA(0), DMA(1), DMA(3), and DMA(4). According to the sorting result of the sorting (1), the memory management circuit 51 may sequentially send the direct memory access command sequences DMA (3), DMA(1), DMA(4), and DMA(0) to the rewritable non-volatile memory module 43. In this way, the data that has been read first may be returned to the memory management circuit 51, thereby preventing the bandwidth of the channel 71(0) from being wasted.

After completing the read commands CMD(0), CMD(1), CMD(3), and CMD(4), the memory management circuit 51 may continuously send the read command sequences CMS (2) and CMS(5) to the rewritable non-volatile memory module 43 according to the read commands CMD(2) and CMD(5) in the command sequences 1201 and 1202. In response to the read command sequences CMS(2) and CMS(5), the plane (0) and the plane (2) in the chip enable region CE(0) may simultaneously or sequentially enter the busy state to execute the corresponding read operations. Then, the rewritable non-volatile memory module 43 may store the read data in the buffer area inside the rewritable non-volatile memory module 43. In addition, according to the comparison result of the performance comparison (2), the memory management circuit 51 may execute the sorting (2) on the direct memory access command sequences DMA (2) and DMA(5) and sequentially send the direct memory access command sequences DMA(5) and DMA(2) to the rewritable non-volatile memory module 43. In this way, the data that has been read first may be returned to the memory management circuit 51, thereby preventing the bandwidth of the channel 71(0) from being wasted.

It should be noted that in the exemplary embodiment of FIG. 15, the time length spent to complete the entire data read operation corresponding to the read commands CMD (0) to CMD(5) may be represented by $\Delta T(4)$. In particular, in the absence of special interference, $\Delta T(4)$ may be less than $\Delta T(3)$, thereby improving the data reading performance.

Figure 16:
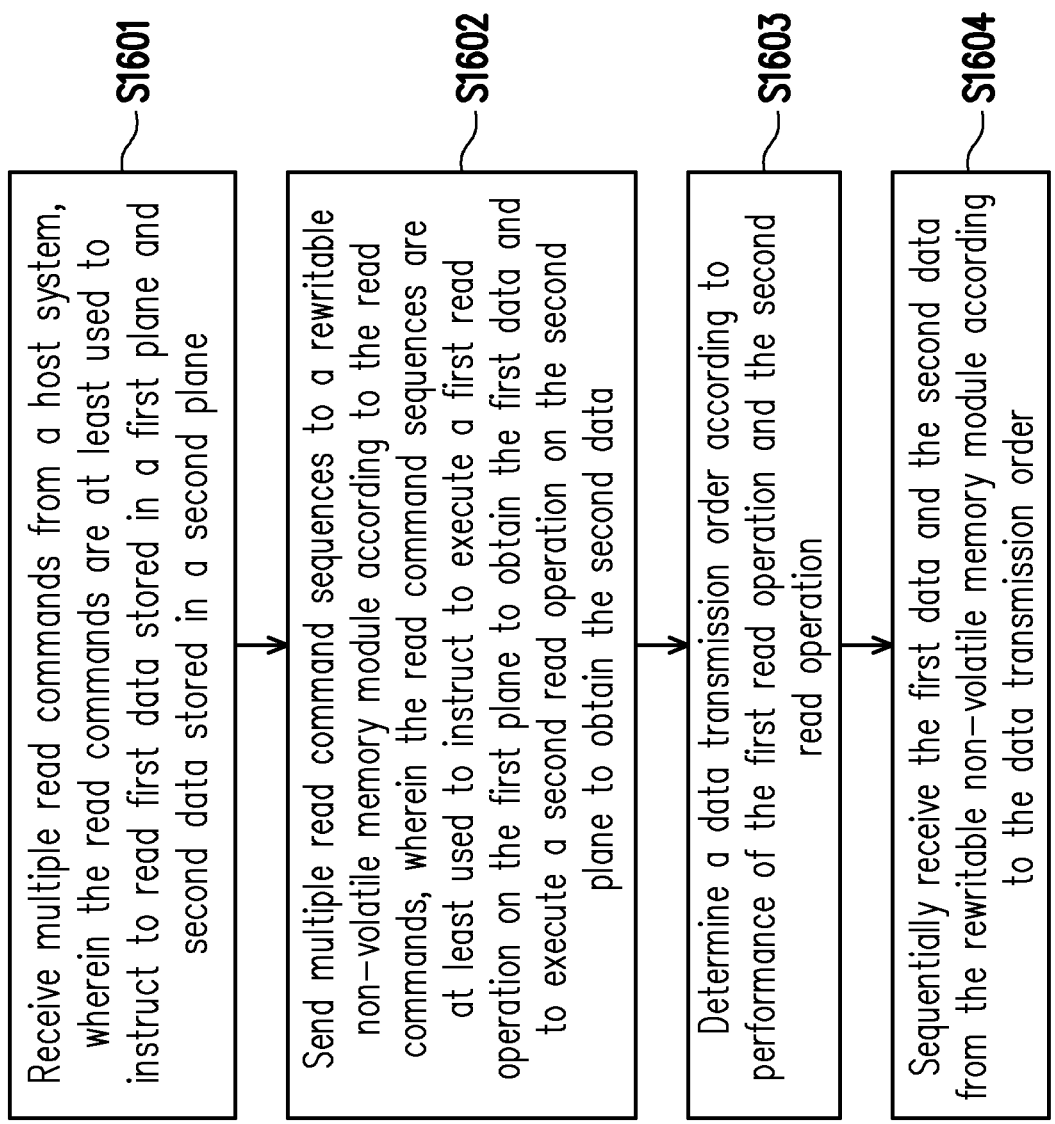
FIG. 16 is a flowchart of a data reading method according to an exemplary embodiment of the disclosure.

FIG. 16 is a flowchart of a data reading method according to an exemplary embodiment of the disclosure.

Please refer to FIG. 16. In Step S1601, multiple read commands are received from a host system, wherein the read commands are at least used to instruct to read first data stored in a first plane and second data stored in a second plane. In Step S1602, multiple read command sequences are sent to a rewritable non-volatile memory module according to the read commands, wherein the read command sequences are at least used to instruct to execute a first read operation on the first plane to obtain the first data and to execute a second read operation on the second plane to obtain the second data. In Step S1603, a data transmission order is determined according to performance of the first read operation and the second read operation. In Step S1604, according to the data transmission order, the first data and the second data are sequentially received from the rewritable non-volatile memory module.

However, each step in FIG. 16 has been described in detail above and will not be repeated here. It should be noted that each step in FIG. 16 may be implemented as multiple codes or circuits, which is not limited in the disclosure. In addition, the method of FIG. 16 may be used in combination with the above exemplary embodiments or may be used alone, which is not limited in the disclosure.

In summary, after receiving the read commands from the host system, the read command sequences may be sent correspondingly. The read command sequences may at least instruct to respectively execute the data read operations on different planes in the same chip enable region. According to the performance of the executed data read operations, the data transmission order may be determined. Then, according to the data transmission order, the data respectively read from the planes may be sequentially sent from the rewritable non-volatile memory module through a customized order. In this way, the data reading performance of different planes in the same chip enable region can be improved.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A data reading method for a rewritable non-volatile memory module, wherein the rewritable non-volatile memory module comprises a plurality of chip enable regions, a first chip enable region among the chip enable regions comprises a plurality of planes, and the planes comprise a first plane and a second plane, the data reading method comprising:

receiving a plurality of read commands from a host system, wherein the read commands are at least used to instruct to read first data stored in the first plane and second data stored in the second plane;

sending a plurality of read command sequences to the rewritable non-volatile memory module according to the read commands, wherein the read command sequences are at least used to instruct to execute a first read operation on the first plane to obtain the first data and to execute a second read operation on the second plane to obtain the second data;

performing a performance comparison on the first read operation and the second read operation to obtain a comparison result;

sorting, according to the comparison result, a first direct memory access command sequence corresponding to the first read operation and a second direct memory access command sequence corresponding to the second read operation to obtain a sorting result, wherein both of the first direct memory access command sequence and the second direct memory access command sequence are configured to read data stored in a buffer area of the rewritable non-volatile memory module through a specific channel after the first read operation on the first plane and the second read operation on the second plane are performed in parallel; and sequentially sending, based on the sorting result, the first direct memory access command sequence and the second direct memory access command sequence to the rewritable non-volatile memory module to read the first data and the second data from the buffer area of the rewritable non-volatile memory module.

2. The data reading method according to claim 1, further comprising:

in response to performance of the first read operation being better than performance of the second read operation, determining a data transmission order to receive the first data first and then receive the second data.

3. The data reading method according to claim 1, wherein the performance of the first read operation and the second read operation is reflected by a first execution time length of the first read operation and a second execution time length of the second read operation.

4. The data reading method according to claim 1, wherein the step of performing the performance comparison on the first read operation and the second read operation to obtain the comparison result comprises:
   evaluating the performance of the first read operation and the second read operation according to a first type of a first physical unit storing the first data in the first plane and a second type of a second physical unit storing the second data in the second plane.

5. The data reading method according to claim 4, wherein a sorting position of a bit stored in the first physical unit of the first type among a plurality of bits stored in a memory cell is different from a sorting position of a bit stored in the second physical unit of the second type among the bits stored in the memory cell.

6. The data reading method according to claim 1, wherein the first data obtained via the first read operation and the second data obtained via the second read operation are temporarily stored in the buffer area in the rewritable non-volatile memory module.

7. The data reading method according to claim 1, further comprising:
   temporarily storing the received read commands in at least one command queue, wherein a total number of the at least one command queue is less than a total number of the planes.

8. The data reading method according to claim 7, wherein the read commands comprise a first read command and a second read command, the first read command is used to instruct to read the first data stored in the first plane, the second read command is used to instruct to read the second data stored in the second plane, and the step of temporarily storing the received read commands in the at least one command queue comprises:
   temporarily storing the first read command and the second read command in a first command queue among the at least one command queue.

9. The data reading method according to claim 7, wherein the read commands comprise a first read command and a second read command, the first read command is used to instruct to read the first data stored in the first plane, the second read command is used to instruct to read the second data stored in the second plane, and the step of temporarily storing the received read commands in the at least one command queue comprises:
   temporarily storing the first read command in a first command queue among the at least one command queue; and
   temporarily storing the second read command in a second command queue among the at least one command queue.

10. The data reading method according to claim 1, comprising:
    recording information reflecting a data transmission order; and
    under a premise of not adjusting a sort of the read commands temporarily stored in the at least one command queue, sequentially receiving the first data and the second data from the rewritable non-volatile memory module according to the data transmission order.

11. A memory storage device, comprising:
    a connection interface unit, configured to couple to a host system;
    a rewritable non-volatile memory module, wherein the rewritable non-volatile memory module comprises a plurality of chip enable regions, a first chip enable region among the chip enable regions comprises a plurality of planes, and the planes comprise a first plane and a second plane; and
    a memory control circuit unit, coupled to the connection interface unit and the rewritable non-volatile memory module,
    wherein the memory control circuit unit is configured to:
       receive a plurality of read commands from the host system, wherein the read commands are at least used to instruct to read first data stored in the first plane and second data stored in the second plane;
       send a plurality of read command sequences to the rewritable non-volatile memory module according to the read commands, wherein the read command sequences are at least used to instruct to execute a first read operation on the first plane to obtain the first data and to execute a second read operation on the second plane to obtain the second data;
       perform a performance comparison on the first read operation and the second read operation to obtain a comparison result;
       sort, according to the comparison result, a first direct memory access command sequence corresponding to the first read operation and a second direct memory access command sequence corresponding to the second read operation to obtain a sorting result, wherein both of the first direct memory access command sequence and the second direct memory access command sequence are configured to read data stored in a buffer area of the rewritable non-volatile memory module through a specific channel after the first read operation on the first plane and the second read operation on the second plane are performed in parallel; and
       sequentially send, based on the sorting result, the first direct memory access command sequence and the second direct memory access command sequence to the rewritable non-volatile memory module to read the first data and the second data from the buffer area of the rewritable non-volatile memory module.

12. The memory storage device according to claim 11, wherein the memory control circuit unit is further configured to:
    in response to performance of the first read operation being better than performance of the second read operation, determining a data transmission order to receive the first data first and then receive the second data.

13. The memory storage device according to claim 11, wherein the performance of the first read operation and the second read operation is reflected by a first execution time length of the first read operation and a second execution time length of the second read operation.

14. The memory storage device according to claim 11, wherein the operation of the memory control circuit unit performing the performance comparison on the first read operation and the second read operation to obtain the comparison result comprises:
    evaluating the performance of the first read operation and the second read operation according to a first type of a first physical unit storing the first data in the first plane and a second type of a second physical unit storing the second data in the second plane.

15. The memory storage device according to claim 14, wherein a sorting position of a bit stored in the first physical unit of the first type among a plurality of bits stored in a memory cell is different from a sorting position of a bit stored in the second physical unit of the second type among the bits stored in the memory cell.

16. The memory storage device according to claim 11, wherein the first data obtained via the first read operation and the second data obtained via the second read operation are temporarily stored in the buffer area in the rewritable non-volatile memory module.

17. The memory storage device according to claim 11, wherein the memory control circuit unit is further configured to:
temporarily store the received read commands in at least one command queue, wherein a total number of the at least one command queue is less than a total number of the planes.

18. The memory storage device according to claim 17, wherein the read commands comprise a first read command and a second read command, the first read command is used to instruct to read the first data stored in the first plane, the second read command is used to instruct to read the second data stored in the second plane, and the operation of the memory control circuit unit temporarily storing the received read commands in the at least one command queue comprises:
temporarily storing the first read command and the second read command in a first command queue among the at least one command queue.

19. The memory storage device according to claim 17, wherein the read commands comprise a first read command and a second read command, the first read command is used to instruct to read the first data stored in the first plane, the second read command is used to instruct to read the second data stored in the second plane, and the operation of the memory control circuit unit temporarily storing the received read commands in the at least one command queue comprises:
temporarily storing the first read command in a first command queue among the at least one command queue; and
temporarily storing the second read command in a second command queue among the at least one command queue.

20. The memory storage device according to claim 17, wherein the memory control circuit unit is further configured to:
recording information reflecting a data transmission order; and
under a premise of not adjusting a sort of the read commands temporarily stored in the at least one command queue, sequentially receiving the first data and the second data from the rewritable non-volatile memory module according to the data transmission order.

21. A memory control circuit unit for controlling a rewritable non-volatile memory module, wherein the rewritable non-volatile memory module comprises a plurality of chip enable regions, a first chip enable region among the chip enable regions comprises a plurality of planes, and the planes comprise a first plane and a second plane, the memory control circuit unit comprising:

a host interface, configured to couple to a host system;
a memory interface, configured to couple to the rewritable non-volatile memory module; and
a memory management circuit, coupled to the host interface and the memory interface,
wherein the memory management circuit is configured to:
receive a plurality of read commands from the host system, wherein the read commands are at least used to instruct to read first data stored in the first plane and second data stored in the second plane;
send a plurality of read command sequences to the rewritable non-volatile memory module according to the read commands, wherein the read command sequences are at least used to instruct to execute a first read operation on the first plane to obtain the first data and to execute a second read operation on the second plane to obtain the second data;
perform a performance comparison on the first read operation and the second read operation to obtain a comparison result;
sort, according to the comparison result, a first direct memory access command sequence corresponding to the first read operation and a second direct memory access command sequence corresponding to the second read operation to obtain a sorting result, wherein both of the first direct memory access command sequence and the second direct memory access command sequence are configured to read data stored in a buffer area of the rewritable non-volatile memory module through a specific channel after the first read operation on the first plane and the second read operation on the second plane are performed in parallel; and
sequentially send, based on the sorting result, the first direct memory access command sequence and the second direct memory access command sequence to the rewritable non-volatile memory module to read the first data and the second data from the buffer area of the rewritable non-volatile memory module.

22. The memory control circuit unit according to claim 21, wherein the memory management circuit is further configured to:
in response to performance of the first read operation being better than performance of the second read operation, determining a data transmission order to receive the first data first and then receive the second data.

23. The memory control circuit unit according to claim 21, wherein the performance of the first read operation and the second read operation is reflected by a first execution time length of the first read operation and a second execution time length of the second read operation.

24. The memory control circuit unit according to claim 21, wherein the operation of the memory management circuit performing the performance comparison on the first read operation and the second read operation to obtain the comparison result comprises:
evaluating the performance of the first read operation and the second read operation according to a first type of a first physical unit storing the first data in the first plane and a second type of a second physical unit storing the second data in the second plane.

25. The memory control circuit unit according to claim 24, wherein a sorting position of a bit stored in the first physical unit of the first type among a plurality of bits stored in a memory cell is different from a sorting position of a bit stored in the second physical unit of the second type among the bits stored in the memory cell.

26. The memory control circuit unit according to claim 21, wherein the first data obtained via the first read operation and the second data obtained via the second read operation are temporarily stored in the buffer area in the rewritable non-volatile memory module.

27. The memory control circuit unit according to claim 21, wherein the memory management circuit is further configured to:
   temporarily store the received read commands in at least one command queue, wherein a total number of the at least one command queue is less than a total number of the planes.

28. The memory control circuit unit according to claim 27, wherein the read commands comprise a first read command and a second read command, the first read command is used to instruct to read the first data stored in the first plane, the second read command is used to instruct to read the second data stored in the second plane, and the operation of the memory management circuit temporarily storing the received read commands in the at least one command queue comprises:
   temporarily storing the first read command and the second read command in a first command queue among the at least one command queue.

29. The memory control circuit unit according to claim 27, wherein the read commands comprise a first read command and a second read command, the first read command is used to instruct to read the first data stored in the first plane, the second read command is used to instruct to read the second data stored in the second plane, and the operation of the memory management circuit temporarily storing the received read commands in the at least one command queue comprises:
   temporarily storing the first read command in a first command queue among the at least one command queue; and
   temporarily storing the second read command in a second command queue among the at least one command queue.

30. The memory control circuit unit according to claim 21, wherein the memory management circuit is further configured to:
   recording information reflecting a data transmission order; and
   under a premise of not adjusting a sort of the read commands temporarily stored in the at least one command queue, sequentially receiving the first data and the second data from the rewritable non-volatile memory module according to the data transmission order.

* * * * *